United States Patent
Yamaguchi et al.

(10) Patent No.: US 10,087,299 B2
(45) Date of Patent: Oct. 2, 2018

(54) POLYOLEFIN RESIN FOAM PARTICLES AND PRODUCTION METHOD FOR SAME

(71) Applicant: Kaneka Corporation, Osaka (JP)

(72) Inventors: Takema Yamaguchi, Osaka (JP); Shintaro Miura, Osaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 15/686,678

(22) Filed: Aug. 25, 2017

(65) Prior Publication Data

US 2017/0349721 A1    Dec. 7, 2017

Related U.S. Application Data

(63) Continuation of application No. PCT/JP2016/055625, filed on Feb. 25, 2016.

(30) Foreign Application Priority Data

Feb. 26, 2015   (JP) ................................. 2015-037217

(51) Int. Cl.
  *C08J 9/16*   (2006.01)
  *C08J 9/20*   (2006.01)
  *C08J 9/12*   (2006.01)
  *C08J 9/14*   (2006.01)

(52) U.S. Cl.
  CPC .............. *C08J 9/127* (2013.01); *C08J 9/122* (2013.01); *C08J 9/141* (2013.01); *C08J 9/16* (2013.01); *C08J 2203/06* (2013.01); *C08J 2203/10* (2013.01); *C08J 2203/14* (2013.01); *C08J 2203/182* (2013.01); *C08J 2323/12* (2013.01); *C08J 2471/02* (2013.01); *C08J 2483/04* (2013.01)

(58) Field of Classification Search
  CPC ... C08J 9/122; C08J 9/125; C08J 9/127; C08J 9/16; C08J 9/20; C08J 2203/10; C08J 2323/12; C08J 2391/06; C08J 2483/04
  See application file for complete search history.

(56) References Cited

U.S. PATENT DOCUMENTS

| 2010/0192289 A1 | 8/2010 | Shibaya et al. |
| 2014/0249259 A1* | 9/2014 | Inagaki ................. C08F 255/02 524/264 |

FOREIGN PATENT DOCUMENTS

| JP | 2002-293975 A | 10/2002 |
| JP | 2002293975 A * | 10/2002 |
| JP | 2009-209334 A | 9/2009 |
| JP | 2010-180295 A | 8/2010 |
| JP | 2013-032418 A | 2/2013 |
| JP | 2013-67816 A | 4/2013 |
| JP | 2013-241534 A | 12/2013 |
| WO | 2008/117734 A1 | 10/2008 |

OTHER PUBLICATIONS

International Preliminary Report on Patentability issued in International Application No. PCT/JP2016/055625, dated Sep. 8, 2017 (7 pages).
International Search Report issued in International Application No. PCT/JP2016/055625, dated May 17, 2016 (2 pages).

* cited by examiner

*Primary Examiner* — Kara B Boyle
(74) *Attorney, Agent, or Firm* — Osha Liang LLP (57) ABSTRACT

An expanded polyolefin resin particle is obtained by expanding a polyolefin resin particle using water and/or an inorganic gas as a foaming agent. The polyolefin resin particle includes a polyolefin resin, a product obtained by heating and kneading a mixture, and a water absorbing substance, wherein the mixture includes a first polypropylene resin, a polypropylene wax, a polyorganosiloxane including at least one silicon-atom-bound radical polymerizable functional group per molecule, and an organic peroxide.

9 Claims, 2 Drawing Sheets

FIG. 2

FIG. 2 DSC CURVE ON EXPANDED POLYPROPYLENE RESIN PARTICLES

POLYOLEFIN RESIN FOAM PARTICLES AND PRODUCTION METHOD FOR SAME

TECHNICAL FIELD

One or more embodiments of the present invention relate to expanded polyolefin resin particles suitably usable in the production of a polypropylene resin in-mold expanded molded product for use in shock-absorbing packing materials, returnable containers, and automobile materials (e.g., toolboxes, floor core materials, and the like) and a method for producing the expanded polyolefin resin particles.

BACKGROUND

Polyolefin resin expanded molded products are widely used in applications of shock-absorbing packing materials, returnable containers, materials for automobiles (e.g., toolboxes, floor core materials, etc.), and the like. However, these polyolefin resin expanded molded products sometimes generate annoying high-frequency frictional sound (squeaky sound) when rubbed against each other or against some other plastic product or metal product or the like.

Known methods for preventing frictional sound from a polyolefin resin expanded molded product are: a method of obtaining a polyolefin resin expanded molded product by molding expanded polyolefin resin particles which are obtained by expanding resin particles composed of a resin composition obtained by melting and kneading a polysiloxane into a polyolefin resin (Patent Literature 1); a method of obtaining a polypropylene resin expanded molded product by molding expanded polypropylene resin particles composed of a resin composition which is obtained by melting and kneading a polyethylene wax having a molecular weight of 1000 or greater and 4000 or less into a polypropylene resin (Patent Literature 2); and the like.

However, in these methods, there is room for improvement in the ability to continuously prevent the frictional sound. Furthermore, in the method of Patent Literature 1, the polysiloxane bleeds out of the base material resin and thus there is room for improvement in the fusibility of expanded particles when the expanded molded product is produced. In the meantime, the method of Patent Literature 1 utilizes a lipophilic hydrocarbon (e.g., butane) as a foaming agent when producing expanded particles.

In this regard, the inventors conducted a study on changing the foaming agent to water and/or carbon dioxide gas in the method of Patent Literature 1, and the study revealed that the use of water and/or carbon dioxide gas as a foaming agent reduces the foamability during the production of expanded particles. The inventors conducted a subsequent study and inferred the following. In the case where water and/or inorganic gas is/are used as a foaming agent, it is necessary to increase the moisture content of resin particles by allowing the resin particles to absorb water to increase foamability. However, the water repelling effect of the siloxane inhibits the water absorption by the resin particles. This results in a reduction in foamability.

Patent Literatures 3 and 4 are also examples of literatures that disclose techniques related to expanded polypropylene resin particles and polypropylene resin compositions.

CITATION LIST

Patent Literature

[Patent Literature 1]
Japanese Patent Application Publication Tokukai No. 2010-180295 (Publication date: Aug. 19, 2010)
[Patent Literature 2]
Japanese Patent Application Publication Tokukai No. 2013-67816 (Publication date: Apr. 18, 2013)
[Patent Literature 3]
Japanese Patent Application Publication Tokukai No. 2009-209334 (Publication date: Sep. 17, 2009)
[Patent Literature 4]
Japanese Patent Application Publication Tokukai No. 2013-241534 (Publication date: Dec. 5, 2013)

SUMMARY

One or more embodiments of the present invention are directed to expanded polyolefin resin particles produced by using water and/or an inorganic gas as a foaming agent without causing a reduction in foamability, the expanded polyolefin resin particles being such that, when the expanded polyolefin resin particles are made into expanded molded products and rubbed against each other or against some other plastic product or metal product or the like, the expanded molded products do not generate annoying high-frequency frictional sound (squeaky sound). One or more embodiments of the present invention provide a method to obtain an expanded molded product without reducing the fusibility of the expanded polyolefin resin particles when molding the expanded polyolefin resin particles in a mold.

The inventors have found that, with the use of polyolefin resin particles composed of a polyolefin resin composition that contains a polyolefin resin (a), a product (b), and a water absorbing substance (c), (the product (b) is obtained by heating and kneading a mixture containing a polypropylene resin (1) ("first polypropylene resin"), a polypropylene wax (2), a polyorganosiloxane (3) containing at least one silicon-atom-bound radical polymerizable functional group per molecule, and an organic peroxide (4), and may be hereinafter referred to as the "product (b)" for short), expanded polyolefin resin particles obtained by the following method maintain a high foamability although the polyolefin resin particles contain a substance having water repellency. That is, the method involves: dispersing polyolefin resin particles along with a foaming agent (specifically, water and/or an inorganic gas) into an aqueous dispersion medium in a closed vessel; heating the inside of the closed vessel to a temperature equal to or higher than the softening temperature of the polyolefin resin particles and subjecting the closed vessel to pressure; and thereafter releasing the aqueous dispersion medium in which the polyolefin resin particles and the foaming agent are dispersed to a region having a pressure lower than the internal pressure of the closed vessel to thereby expand the polyolefin resin particles.

The inventors have further found that, when the expanded polyolefin resin particles are expanded and molded in a mold, a high fusibility is maintained between the expanded polyolefin resin particles and, in addition, the resulting expanded molded product continuously keeps the effect of preventing or reducing frictional sound (squeaky sound).

One or more embodiments of the present invention can be described as below.

[1] An expanded polyolefin resin particle obtained by expanding, by using water and/or an inorganic gas as a foaming agent, a polyolefin resin particle that contains: a polyolefin resin (a); a product (b) obtained by heating and kneading a mixture containing a polypropylene resin (1) ("first polypropylene resin"), a polypropylene wax (2), a polyorganosiloxane (3) containing at least one silicon-atombound radical polymerizable functional group per molecule, and an organic peroxide (4); and a water absorbing substance (c).

[2] The expanded polyolefin resin particle according to [1], wherein the polyolefin resin particle further contains a non-radical polymerizable polyorganosiloxane (d).

[3] The expanded polyolefin resin particle according to [1] or [2], wherein the polyolefin resin (a) is a polypropylene resin ("second polypropylene resin"). In one or more embodiments of the present invention, the first polypropylene resin and the second polypropylene resin are the same or different.

[4] The expanded polyolefin resin particle according to any one of [1] to [3], wherein the water absorbing substance (c) is at least one selected from the group consisting of melamine, glycerin, diglycerin, polyethylene glycol, and zinc borate.

[5] The expanded polyolefin resin particle according to any one of [1] to [4], wherein the polyolefin resin particle contains the product (b) in an amount of 0.5 parts by weight or more and 15 parts by weight or less with respect to 100 parts by weight of the polyolefin resin (a), the product (b) being a product in which the polyorganosiloxane (3) is grafted on the polypropylene resin (1) and the polypropylene wax (2).

[6] The expanded polyolefin resin particle according to any one of [1] to [5], wherein the polyolefin resin particle contains the water absorbing substance (c) in an amount of 0.01 parts by weight or more and 1 part by weight or less with respect to 100 parts by weight of the polyolefin resin (a).

[7] The expanded polyolefin resin particle according to any one of [2] to [6], wherein the polyolefin resin particle contains the non-radical polymerizable polyorganosiloxane (d) in an amount of 10 parts by weight or more and 60 parts by weight or less with respect to 100 parts by weight of the product (b) in which the polyorganosiloxane (3) is grafted on the polypropylene resin (1) and the polypropylene wax (2).

[8] A method for producing expanded polyolefin resin particles comprising: dispersing polyolefin resin particles along with a foaming agent into an aqueous dispersion medium in a closed vessel; heating an inside of the closed vessel to a temperature equal to or higher than a softening temperature of the polyolefin resin particles and subjecting the closed vessel to pressure; and thereafter releasing, to a region having a pressure lower than an internal pressure of the closed vessel, the aqueous dispersion medium in which the polyolefin resin particles and the foaming agent are dispersed, to obtain the expanded polyolefin resin particles, wherein the polyolefin resin particles contain a polyolefin resin (a), a product (b) obtained by heating and kneading a mixture containing a polypropylene resin (1), a polypropylene wax (2), a polyorganosiloxane (3) containing at least one silicon-atom-bound radical polymerizable functional group per molecule, and an organic peroxide (4), and a water absorbing substance (c), and the foaming agent is water and/or an inorganic gas.

[9] The method according to [8], wherein the polyolefin resin particles contain 100 parts by weight of the polyolefin resin (a), 0.5 parts by weight or more and 15 parts by weight or less of the product (b), which is obtained by heating and kneading the mixture containing the polypropylene resin (1), the polypropylene wax (2), the polyorganosiloxane (3) containing at least one silicon-atom-bound radical polymerizable functional group per molecule, and the organic peroxide (4), and 0.01 parts by weight or more and 1 part by weight or less of the water absorbing substance (c).

According to one or more embodiments of the present invention, it is possible, in the case of obtaining expanded polyolefin resin particles with the use of water and/or an inorganic gas (e.g., carbon dioxide) as a foaming agent, to obtain target expanded polyolefin resin particles while maintaining good foamability. Furthermore, a polyolefin expanded molded product obtained by expanding and molding the expanded polyolefin resin particles in a mold has the continuous effect of preventing or reducing frictional sound (squeaky sound).

BRIEF DESCRIPTION OF THE DRAWINGS

FIG. 2 shows a DSC curve (temperature vs heat absorption quantity) obtained by a differential scanning calorimetry (DSC) in which the temperature of expanded polypropylene resin particles obtained in Example 1 is raised from 40° C. to 220° C. at a heating rate of 10° C./min. An entire melting heat quantity (Q), a low temperature-side melting heat quantity (Q1), and a high temperature-side melting heat quantity (Qh) of the expanded polypropylene resin particles are defined as follows. In the DSC curve obtained, the entire melting heat quantity (Q=Q1+Qh), which is the sum of the low temperature-side melting heat quantity (Q1) and the high temperature-side melting heat quantity (Qh), is indicated by a part surrounded by a (i) line segment A-B which is drawn so as to connect a heat absorption quantity (point A) at a temperature of 80° C. and a heat absorption quantity (point B) at a temperature at which melting on a high temperature side ends and (ii) the DSC curve. The low temperature-side melting heat quantity (Q1) is indicated by a part surrounded by a line segment A-D, a line segment C-D, and the DSC curve, and the high temperature-side melting heat quantity (Qh) is indicated by a part surrounded by a line segment B-D, the line segment C-D, and the DSC curve where (i) a point C is a point at which a heat absorption quantity between two melting heat quantity regions in the DSC curve is the smallest, the two melting heat quantity regions being a region of the low temperature-side melting heat quantity and a region of the high temperature-side melting heat quantity and (ii) a point D is a point at which the line segment A-B intersects a line that is drawn so as to extend, parallel to a Y-axis, from the point C toward the line segment A-B.

DETAILED DESCRIPTION OF THE EMBODIMENTS

The following description will discuss one or more embodiments of the present invention. However, the present invention is not limited to the following embodiments. The present invention is not limited to any of configurations described below, but can be altered in many ways within the scope of the claims. An embodiment and/or an example derived from a proper combination of technical means disclosed in different embodiments and/or examples are/is also encompassed in the technical scope of the present invention. In addition, all of the academic documents and patent literature listed herein are incorporated by reference herein.

[1. Expanded Polyolefin Resin Particles]

Expanded polyolefin resin particles of one or more embodiments of the present invention are expanded polyolefin resin particles obtained by expanding, by using water and/or carbon dioxide as a foaming agent, polyolefin resin particles composed of a polyolefin resin composition that contains: a polyolefin resin (a); a product (b) obtained by heating and kneading a mixture containing a polypropylene resin (1), a polypropylene wax (2), a polyorganosiloxane (3) containing at least one silicon-atom-bound radical polymerizable functional group per molecule, and an organic peroxide (4) (or a mixture consisting of the polypropylene resin (1), the polypropylene wax (2), the polyorganosiloxane (3) containing at least one silicon-atom-bound radical polymerizable functional group per molecule, and the organic peroxide (4)); and a water absorbing substance (c).

[1-1. Polyolefin Resin (a)]

Examples of the polyolefin resin (a) for use in one or more embodiments of the present invention include polyethylene resins and polypropylene resins. These resins may be used individually or two or more of them may be used in combination.

Examples of a polyethylene resin for use in one or more embodiments of the present invention include high-density polyethylene, medium-density polyethylene, low-density polyethylene, and linear low-density polyethylene. These polyethylene resins may be used individually or two or more of them may be used in combination.

Examples of a polypropylene resin for use in one or more embodiments of the present invention include propylene homopolymers, α-olefin-polypropylene random copolymers, and α-olefin-polypropylene block copolymers. These polypropylene resins may be used individually or two or more of them may be used in combination.

The term "α-olefin-polypropylene random copolymer" denotes a polypropylene-based random copolymer that contains propylene and an α-olefin that is other than propylene. Examples of the α-olefin include C2 or C4 to C12 α-olefins such as 1-butene, ethylene, isobutene, 1-pentene, 3-methyl-1-butene, 1-hexene, 4-methyl-1-pentene, 3,4-dimethyl-1-butene, 1-heptene, 3-methyl-1-hexene, 1-octene, and 1-decene. These α-olefins may be used individually or in combination. In view of foamability in obtaining expanded polyolefin resin particles and a good surface property of the polyolefin resin in-mold expanded molded product, α-olefins are 1-butene and/or ethylene may be used. In one or more embodiments of the present invention, the polypropylene-based random copolymer may contain both 1-butene and ethylene.

In the case where the polyolefin resin (a) for use in one or more embodiments of the present invention is a polypropylene resin, the amount of the α-olefin in the polypropylene resin may be 1 wt % or more and 10 wt % or less with respect to 100 wt % of the polypropylene resin. There is a strong tendency that a polypropylene resin containing the α-olefin in an amount less than 1 wt % becomes a resin having a melting point over 160° C. and, even when the resulting expanded particles are to be expanded and molded in a mold, a molding pressure (steam heating pressure) exceeds 0.40 MPa (gage pressure) and thus the particles may be difficult to mold. Even if the resulting expanded particles are expanded and molded in a mold with a molding pressure of 0.40 MPa (gage pressure) or less, a molding cycle tends to become long. If the amount of the α-olefin is more than 10 wt %, the steam heating pressure for in-mold foaming molding decreases but the melting point of the polypropylene resin itself lowers and rigidity also decreases, and thus the molding cycle tends to become long and the resulting molded product tends not to satisfy practical rigidity such as compressive strength. In the case where the practical rigidity of the molded product is not satisfactory, the expansion ratio of the molded product has to be reduced and, in such a case, the density of the molded product becomes large and a lightweight molded product cannot be easily obtained. Under such circumstances, the amount of the α-olefin may be 2 wt % or more and 8 wt % or less, or 3 wt % or more and 6 wt % or less, with respect to 100 wt % of the polypropylene resin.

The polypropylene resin for use in one or more embodiments of the present invention may have a flexural modulus, which is measured in accordance with JIS K7171, of 800 MPa or more and 1700 MPa or less, or 1000 MPa or more and 1600 MPa or less. When the flexural modulus is less than 800 MPa, it may not be possible to achieve a satisfactory mechanical strength when the resulting molded product is used in an automobile application. If the flexural modulus is more than 1700 MPa, the molding pressure for in-mold molding tends to become high.

The polypropylene resin for use in one or more embodiments of the present invention may have a melt flow rate (hereinafter may be referred to as "MFR" for short) of 5 g/10 min. or more and 20 g/10 min. or less, or 6 g/10 min. or more and 12 g/10 min. or less. If the MFR of the polypropylene resin is less than 5 g/10 min., the expanding power in the production of expanded particles is low and thus it may be difficult to obtain expanded particles having a high expansion ratio. Furthermore, it may be difficult to obtain the fusion strength between expanded particles of the resulting expanded molded product. Furthermore, if the MFR of the polypropylene resin is more than 20 g/10 min., cells may be broken when expanded particles are produced.

Note that the MFR in accordance with one or more embodiments of the present invention is measured with the use of an MFR measuring instrument described in JIS-K7210 and under conditions involving (i) an orifice having a diameter of 2.0959±0.005 mm and a length of 8.000±0.025 mm, (ii) a load of 2160 g, and (iii) a temperature of 230° C.±0.2° C.

The melting point of the polypropylene resin for use in one or more embodiments of the present invention may be, for an expanded molded product having a good mechanical strength and a good heat resistance to be obtained, 130° C. or higher and 160° C. or lower, 135° C. or higher and 160° C. or lower, or 140° C. or higher and 155° C. or lower. When the melting point of the polypropylene resin is 130° C. or higher and 160° C. or lower, there is a strong tendency that the molding pressure for in-mold molding is suitably raised (moldability) and that the mechanical strength and the heat resistance of the expanded molded product can be readily balanced.

Figure 1:
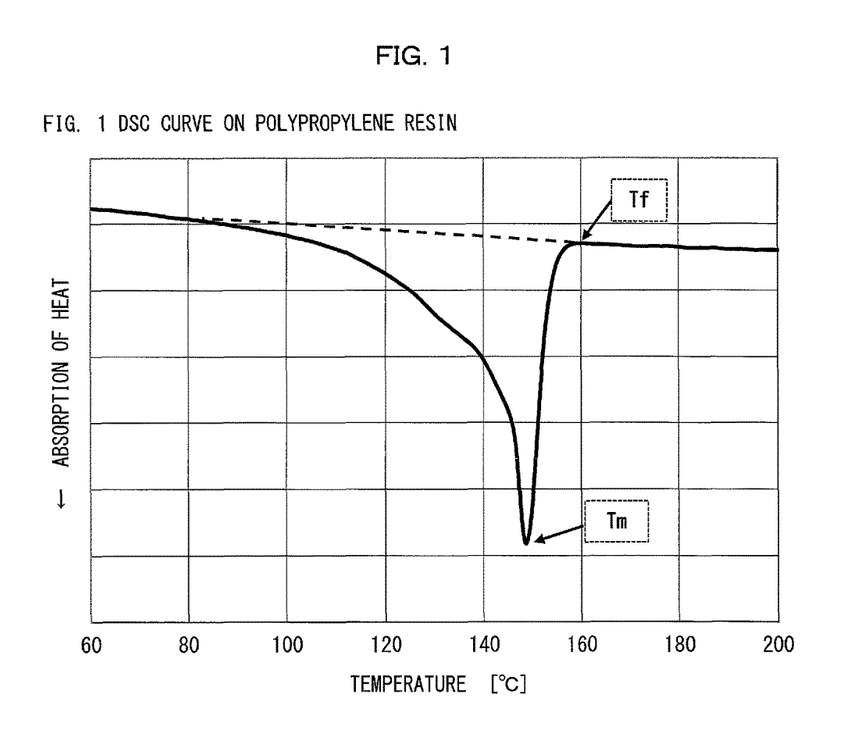
FIG. 1 shows an example of the result obtained by measuring, with the use of a differential scanning calorimeter (DSC), a melting peak temperature of a polypropylene resin according to one or more embodiments of the present invention. The melting peak temperature was measured in a second temperature rise on a DSC curve obtained by, with the use of the DSC, (i) raising the temperature of the polypropylene resin used in Example 1 from 40° C. to 220° C. at a rate of 10° C./min. and thereafter (ii) lowering the temperature from 220° C. to 40° C. at a rate of 10° C./min., and (iii) raising the temperature again from 40° C. to 220° C. at a rate of 10° C./min.

It should be noted, here, that the melding point of the polypropylene resin is, as shown in FIG. 1, measured in the following manner: a 1 mg or more and 10 mg or less of a polypropylene resin is heated from 40° C. to 220° C. at a rate of 10° C./min. and thereafter cooled from 220° C. to 40° C.

at a rate of 10° C./min. and again heated from 40° C. to 220° C. at a rate of 10° C./min. with the use of a differential scanning calorimeter DSC to obtain a DSC curve and a melting peak temperature (Tm in FIG. 1) on the DSC curve in the second temperature raise is the melting point of the polypropylene resin.

It should be noted that, since the product (b) (described later) has a polypropylene molecular chain, the polyolefin resin (a) in one or more embodiments of the present invention may be a polypropylene resin in view of the compatibility between the polyolefin resin (a) and the product (b).

[1-2. Product (b)]

The polyolefin resin particles of one or more embodiments of the present invention contain the product (b) obtained by heating and kneading a mixture containing a polypropylene resin (1), a polypropylene wax (2), a polyorganosiloxane (3) containing at least one silicon-atom-bound radical polymerizable functional group per molecule, and an organic peroxide (4) (or a mixture consisting of the polypropylene resin (1), the polypropylene wax (2), the polyorganosiloxane (3) containing at least one silicon-atom-bound radical polymerizable functional group per molecule, and the organic peroxide (4)) (such a product may be hereinafter referred to as the "product (b)" for short). Since the product (b) is highly compatible with the polyolefin resin (a) (in the case where the polyolefin resin (a) is a polypropylene resin, the compatibility is particularly high), the product (b) can be uniformly dispersed in particles of the polyolefin resin (a) and, in addition, the bleeding of the organosiloxane component is prevented or reduced. As a result, the inhibition of expansion during the production of expanded particles is reduced and the fusibility of the expanded particles is improved in the production of an expanded molded product, and also the resulting expanded molded product provides the long-lasting effect of preventing frictional sound. The resulting expanded molded product also provides long-lasting water repellency.

The product (b) obtained by heating and kneading a mixture containing a polypropylene resin (1), a polypropylene wax (2), a polyorganosiloxane (3) containing at least one silicon-atom-bound radical polymerizable functional group per molecule, and an organic peroxide (4), which is for use in one or more embodiments of the present invention, may be obtained by, for example, the method disclosed in Japanese Patent Application Publication Tokukai No. 2013-241534.

When the mixture containing a polypropylene resin (1), a polypropylene wax (2), a polyorganosiloxane (3) containing at least one silicon-atom-bound radical polymerizable functional group per molecule, and an organic peroxide (4) is heated and kneaded, chemical bonds (grafting) may be formed between the component (3) and the components (1) and (2) by the radical polymerizable functional groups in the component (3). Therefore, the concept of the product (b) of one or more embodiments of the present invention may include: compounds in which the component (3) has chemical bonds with the component (1); and compounds in which the component (3) has chemical bonds with the component (2).

The polypropylene resin (1) for use in the production of the product (b) is a resin composed of a propylene homopolymer, a copolymer (e.g., block copolymer, random copolymer, graft copolymer, or the like) of propylene and an α-olefin other than propylene (e.g., ethylene, 1-butene, or the like), or a mixture of these polymers.

The polypropylene wax (2) for use in the production of the product (b) is obtained by polymerizing propylene or by depolymerizing an ordinary high-molecular-weight polypropylene. The number average molecular weight of the polypropylene wax may range from about 1000 to 20000.

The polyorganosiloxane (3) containing at least one silicon-atom-bound radical polymerizable functional group per molecule for use in the production of the product (b) is a polyorganosiloxane in which a silicon atom thereof is bound with one or more radical polymerizable functional groups.

Specific examples of the silicon-atom-bound radical polymerizable functional group include acryloxymethyl group, 3-acryloxypropyl group, methacryloxymethyl group, 3-methacryloxypropyl group, 4-vinylphenyl group, 3-vinylphenyl group, 4-(2-propenyl)phenyl group, 3-(2-propenyl) phenyl group, 2-(4-vinylphenyl)ethyl group, 2-(3-vinylphenyl)ethyl group, vinyl group, propenyl group, butenyl group, pentenyl group, hexenyl group, and decenyl group. In view of synthesis and availability, in one or more embodiments of the present invention, the silicon-atom-bound radical polymerizable functional group may be a vinyl group.

It should be noted that, in one or more embodiments of the present invention, the silicon-atom-bound radical polymerizable functional group is not limited to alkenyl groups such as vinyl group, propenyl group, butenyl group, pentenyl group, hexenyl group, and decenyl group and may be any of those listed functional groups.

The organic peroxide (4) for use in the production of the product (b) serves to generate radicals when heated and thereby form chemical bonds (grafting) between the component (3) and the component (1) or between the component (3) and the component (2).

Specific examples of the organic peroxide (4) include: ketone peroxides such as methyl ethyl ketone peroxide, methyl isobutyl ketone peroxide, and cyclohexanon peroxide; diacyl peroxides such as isobutyryl peroxide, lauroyl peroxide, and benzoyl peroxide; hydroperoxides such as diisopropylbenzene hydroperoxide; dialkyl peroxides such as dicumyl peroxide, 2,5-dimethyl-2,5-di-(t-butylperoxy) hexane, 1,3-bis-(t-butylperoxy-isopropyl)-benzene, di-t-butyl peroxide, and 2,5-dimethyl-2,5-di-(t-butylperoxy)-hexane-3; peroxy ketals such as 1,1-di-t-butylperoxy-3,3,5-trimethyl cyclohexane and 2,2-di-(t-butylperoxy)-butane; alkyl peresters such as t-butylperoxy-pivalate and t-butyl peroxybenzoate; and percarbonates such as t-butyl peroxy isopropylcarbonate.

The ratio (weight ratio) of the polypropylene resin (1) to the polypropylene wax (2), which are used to obtain the product (b), may be 85:15 to 50:50, or 80:20 to 60:40. Ratios outside this range may not sufficiently achieve the effects of one or more embodiments of the present invention.

The amount of the polyorganosiloxane (3) containing at least one silicon-atom-bound radical polymerizable functional group per molecule for use in obtaining the product (b) may be 30 to 150 parts by weight, or 40 to 120 parts by weight, with respect to 100 parts by weight of the sum of the component (1) and the component (2). Amounts outside this range may not sufficiently achieve the effects of one or more embodiments of the present invention.

The amount of the organic peroxide (4) for use in obtaining the product (b) may be 0.05 to 3.0 parts by weight, or 0.1 to 1.5 parts by weight, with respect to 100 parts by weight of the sum of the components (1) and (2).

The graft rate of the product (b), which is obtained by grafting the polyorganosiloxane (3) on the polypropylene resin (1) and the polypropylene wax (2), may be 50% or more, 70% or more, or 80% or more. It should be noted here that, as the graft rate increases, the unreacted amount of the polyorganosiloxane (3) decreases, and therefore the higher graft rate may be used because a decrease in foamability during the production of expanded particles and a decrease in mechanical strength of the resulting expanded molded product are prevented or reduced.

It should be noted that the graft rate of the product (b) is a value found in the following manner.

The product (b), which is obtained by grafting the polyorganosiloxane (3) on the polypropylene resin (1) and the polypropylene wax (2), in an amount of 1 g was dissolved with heat in 100 mL of xylene, and then 50 mL of hexane and 50 mL of methanol were added to the solution to allow the components (1) and (2), which have or do not have chemical bonds with the component (3), to precipitate, and the solution containing the precipitate was filtered to thereby remove the component (3) which does not have chemical bonds with the component (1) or (2), such that the precipitate was separated. After that, the precipitate was dried. The dried precipitate and the product (b) were each measured for infrared spectrum using KBr tablet method with the use of an FT-IR (Frontier FT-IR available from Perkin Elmer) with ATR, and the ratio of the absorbance at the absorption peak ($1256 \text{ cm}^{-1}$) derived from the component (3) to the absorbance at the absorption peak ($1376 \text{ cm}^{-1}$) derived from the components (1) and (2), which is represented as [Absorbance derived from component (3)/Absorbance derived from components (1) and (2)], was found. The graft rate was calculated using the following equation.

Graft rate (%)=[Absorbance ratio obtained on dried precipitate/Absorbance ratio obtained on product (b)]×100       Equation The amount of the product (b), which is obtained by heating and kneading a mixture containing a polypropylene resin (1), a polypropylene wax (2), a polyorganosiloxane (3) containing at least one silicon-atom-bound radical polymerizable functional group per molecule, and an organic peroxide (4), in the polyolefin resin particles of one or more embodiments of the present invention may be 0.5 parts by weight or more and 15 parts by weight or less, or 1.0 part by weight or more and 10 parts by weight or less, with respect to 100 parts by weight of the polyolefin resin (a). When the amount of the product (b) is less than 0.5 parts by weight, there is a tendency that the resulting polyolefin in-mold expanded molded product cannot sufficiently yield the effect of preventing or reducing frictional sound (squeaky sound). When the amount of the product (b) is more than 15 parts by weight, the compressive strength of the polyolefin in-mold expanded molded product tends to decrease.

The polyolefin resin particles of one or more embodiments of the present invention may further contain a non-radical polymerizable polyorganosiloxane (d). When the polyolefin resin particles contain the non-radical polymerizable polyorganosiloxane (d), it is possible to continuously keep the effect of preventing or reducing annoying high-frequency frictional sound.

In one or more embodiments of the present invention, there is no particular limitation on when the component (d) is added. The component (d) may be added (i) when a polyolefin resin composition, which is a raw material for polyolefin resin particles, is prepared from the components (a), (b), and (c) or (ii) before or during the heating and kneading in the production of the component (b). It should be noted that the non-radical polymerizable polyorganosiloxane (d) is a polyorganosiloxane different from the component (3) and does not contain radical polymerizable functional groups bound to silicon atoms, which are essential to the component (3). Therefore, the component (d) does not form chemical bonds (graft) with the component (1) or (2).

The amount of the non-radical polymerizable polyorganosiloxane (d) in the polyolefin resin particles of one or more embodiments of the present invention may be 10 parts by weight or more and 60 parts by weight or less, or 20 parts by weight or more and 40 parts by weight or less, with respect to 100 parts by weight of the product (b). More specifically, the polyolefin resin particles of one or more embodiments of the present invention may contain the non-radical polymerizable polyorganosiloxane (d) in an amount of 10 parts by weight or more and 60 parts by weight or less, or 20 parts by weight or more and 40 parts by weight or less, with respect to 100 parts by weight of the product (b), in which the polyorganosiloxane (3) is grafted on the polypropylene resin (1) and the polypropylene wax (2).

It should be noted that examples of the product (b) which contains the non-radical polymerizable polyorganosiloxane (d) include Rikeeido SG-100P and SG-170P (available from Riken Vitamin Co., Ltd.).

[1-3. Water Absorbing Substance (c)]

The water absorbing substance (c) for use in one or more embodiments of the present invention serves to increase the moisture impregnated in the polyolefin resin particles when producing the expanded polyolefin resin particles. The water absorbing substance (c) is able to impart foamability to the polyolefin resin particles in the case where water and/or an inorganic gas is/are used as a foaming agent.

Examples of the water absorbing substance (c) for use in one or more embodiments of the present invention include (i) water soluble inorganic substances such as sodium chloride, calcium chloride, magnesium chloride, sodium borate, calcium borate, zinc borate, potassium aluminum sulfate anhydride, and aluminum ammonium sulfate anhydride, (ii) water absorbing organic substances such as melamine, isocyanuric acid, and melamine-isocyanuric acid condensate, (iii) glycerin, diglycerin, polyethylene glycol, and the like, (iv) hydrophilic polymers such as C12 to C18 fatty alcohols (e.g., pentaerythritol, cetyl alcohol, and stearyl alcohol), and (v) hydrophilic polymers such as polyolefin-polyether block copolymers. Alternatively, the hydrophilic substances disclosed in PCT international publication No. WO97/38048 and Japanese Patent Application Publication Tokukai No. 10-152574 may also be used as the water absorbing substance (c). Two or more of these hydrophilic substances may be used in combination.

In one or more embodiments of the present invention, melamine, glycerin, polyethylene glycol, and zinc borate may be used, because even a small amount of these substances readily increases the expansion ratio of expanded particles without impairing cell uniformity and in-mold foaming moldability of the expanded particles.

The amount of the hydrophilic substance (c) in the polyolefin resin particles of one or more embodiments of the present invention may be 0.01 parts by weight or more and 1 part by weight or less, 0.05 parts by weight or more and 0.7 parts by weight or less, or 0.1 parts by weight or more and 0.6 parts by weight or less, with respect to 100 parts by weight of the polyolefin resin (a).

A study conducted by the inventors has revealed that it may be necessary to increase the amount of a hydrophilic substance in the polyolefin resin particles to allow the polyolefin resin particles to absorb water. This applies in the case where expanded particles are produced from polyolefin resin particles containing a substance that imparts water repellency (e.g., organosiloxane) with the use of water and/or a carbon dioxide gas as a foaming agent. However, in the case where the product (b) is used as the substance that imparts water repellency like one or more embodiments of the present invention, it may be possible, contrary to expectations, to maintain foamability during the production of expanded particles without having to increase the amount of the hydrophilic substance in the polyolefin resin particles.

[1-4. Other Components]

The polyolefin resin particles (in other words, a polyolefin resin composition which is a raw material for the polyolefin resin particles and which contains the components (a), (b), and (c)) may contain an expansion nucleating agent that may become expansion nuclei at the time of expansion.

Examples of the expansion nucleating agent for use in one or more embodiments of the present invention encompass silica (silicon dioxide), silicate, alumina, diatomaceous earth, calcium carbonate, magnesium carbonate, calcium phosphate, feldspar, apatite, and barium sulfate. Examples of silicate encompass talc, magnesium silicate, kaolin, halloysite, dickite, aluminum silicate, and zeolite. These expansion nucleating agents can be used individually or in combination.

In view of uniformity of cell diameters, the amount of the expansion nucleating agent contained in the polyolefin resin particles in accordance with one or more embodiments of the present invention may be equal to or greater than 0.005 parts by weight and equal to or less than 2 parts by weight, equal to or greater than 0.01 parts by weight and equal to or less than 1 part by weight, or equal to or greater than 0.03 parts by weight and equal to or less than 0.5 parts by weight with respect to 100 parts by weight of the polyolefin resin (a).

In one or more embodiments of the present invention, a colorant may be used, provided that the effects of one or more embodiments of the present invention are not impaired. More specifically, the polyolefin resin particles of one or more embodiments of the present invention may contain a colorant. Examples of the colorant for use in one or more embodiments of the present invention encompass carbon black, ultramarine blue, cyanine pigment, azo pigment, quinacridone pigment cadmium yellow, chrome oxide, iron oxide, perylene pigment, and Anthraquinone pigment.

The amount of the colorant contained in the polyolefin resin particles in accordance with one or more embodiments of the present invention may be equal to or greater than 0.001 parts by weight and equal to or less than 10 parts by weight, or equal to or greater than 0.01 parts by weight and equal to or less than 8 parts by weight with respect to 100 parts by weight of the polyolefin resin (a). In a case where blackening is intended with the use of carbon black, in particular, the colorant may be equal to or greater than 1 part by weight and equal to or less than 10 parts by weight with respect to 100 parts by weight of the polyolefin resin (a).

The polyolefin resin particles (in other words, a polyolefin resin composition which is a raw material for the polyolefin resin particles and which contains components (a), (b), and (c)) may contain additives such as an antistatic agent, a flame retarder, an antioxidant, a photo stabilizer, a crystal nucleating agent, and/or a conductive agent as well as a hydrophilic compound, an expansion nucleating agent, and a colorant. Such an additive can be directly added to the polyolefin resin composition. Alternatively, it is possible to (i) prepare a masterbatch by adding, at a high concentration, the additive in another resin and then (ii) add the masterbatch resin to the polyolefin resin composition. In one or more embodiments, polyolefin resins may be used in the preparation of the masterbatch resin.

[2. Method of Producing Expanded Polyolefin Resin Particles and Expanded Molded Product]

In the production of expanded polyolefin resin particles of one or more embodiments of the present invention, first, a step of producing polyolefin resin particles from a base material resin (this step is a granulation step) may be performed.

Examples of the method of producing polyolefin resin particles encompass a method in which an extruder is used. Specifically, it is possible, for example, that a polyolefin resin and, as necessary, an additive (such as another resin, an expansion nucleating agent, a hydrophilic compound, and a colorant) are blended, so that a blended product is obtained, (ii) the blended product is introduced into an extruder and is melted and kneaded, (iii) the resultant product is extruded through a die, and is then allowed to pass through water so as to be cooled, and (iv) the resultant product is chopped with the use of a cutter, so that the polyolefin resin particles in a desired particle shape such as a columnar shape, an ellipsoidal shape, a spherical shape, a cubic shape, and/or a rectangular parallelepiped shape can be obtained. Alternatively, it may be possible to (i) directly extrude the blended product through the die into water, and immediately cut the resultant product into a particle shape, so that particles are obtained, and then (ii) cool the particles. By thus melting and kneading the resins, the resins are made into more uniform polyolefin resin particles.

The weight of each of the polyolefin resin particles thus obtained may be 0.2 mg per particle or more to 10 mg per particle or less, or 0.5 mg per particle or more to 5 mg per particle or less. If the weight of each of the polyolefin resin particles is less than 0.2 mg per particle, then handleability tends to decrease. If the weight is more than 10 mg per particle, then a mold-filling property during an in-mold foaming molding step tends to decrease.

Expanded polyolefin resin particles in accordance with one or more embodiments of the present invention can be produced from polyolefin resin particles thus obtained.

Examples of a method of producing the expanded polyolefin resin particles in accordance with one or more embodiments of the present invention encompass a method of producing expanded polyolefin resin particles by carrying out the following foaming step: (i) polyolefin resin particles along with an inorganic gas as a foaming agent (such as carbon dioxide, nitrogen, and/or air) are dispersed into an aqueous dispersion medium in a pressure-resistant container, (ii) the inside the pressure-resistant container is heated to a temperature equal to or higher than the softening temperature of the polyolefin resin particles and is subjected to pressure, and thereafter (iii) the temperature and the pressure are retained for a certain period of time, and thereafter (iv) the dispersion slurry is released to a region having a pressure lower than an internal pressure of the pressure-resistant container, so that the expanded polyolefin resin particles are obtained (in other words, a method of producing expanded polyolefin resin particles in an aqueous dispersion system).

Specifically, (1) Polyolefin resin particles, an aqueous dispersion medium, and, as necessary, a dispersing agent, for example, are placed into a pressure-resistant container. Then, while the resultant mixture is stirred, the inside of the pressure-resistant container is vacuumed as necessary. Then, a foaming agent having a pressure of 0.5 MPa (gage pressure) or more to 2 MPa (gage pressure) or less is introduced into the pressure-resistant container, and then the inside of the pressure-resistant container is heated to a temperature equal to or higher than the softening temperature of the polyolefin resin. By the heating, the internal pressure of the pressure-resistant container rises to approximately 2 MPa (gage pressure) or more to 5 MPa (gage pressure) or less. If needed, an additional foaming agent is introduced at around a foaming temperature to adjust a foaming pressure to a desired pressure, the temperature is further adjusted, and the temperature and pressure are maintained for a certain period of time, and then the dispersion slurry in the pressure-resistant container is released into a region having a pressure lower than the internal pressure of the pressure-resistant container, whereby expanded polyolefin resin particles are obtained.

In one or more embodiments of the present invention, the following aspect is possible:

(2) Polyolefin resin particles, an aqueous dispersion medium, and, as necessary, a dispersing agent, for example, are placed into a pressure-resistant container. Then, while the resultant mixture is stirred, the inside of the pressure-resistant container is vacuumed as necessary. Then, while the inside of the pressure-resistant container is heated to a temperature equal to or higher than the softening temperature of the polyolefin resin, a foaming agent is introduced into the pressure-resistant container.

In one or more embodiments of the present invention, the following aspect is possible:

(3) Polyolefin resin particles, an aqueous dispersion medium, and, as necessary, a dispersing agent, for example, are placed into a pressure-resistant container. Then, the inside of the pressure-resistant container is heated to a temperature around a foaming temperature. Then, a foaming agent is further introduced into the pressure-resistant container, and the inside of the pressure-resistant container is at foaming temperature. Then, the foaming temperature is retained for a certain period of time. Then, the dispersion slurry in the pressure-resistant container is released into a region having a pressure lower than an internal pressure of the pressure-resistant container, so that expanded polyolefin resin particles are obtained.

Note that the expansion ratio can be adjusted by (i) adjusting a pressure-releasing speed during foaming by increasing the internal pressure of the pressure-resistant container through injecting carbon dioxide, nitrogen, air, or a substance used as a foaming agent, into the pressure-resistant container before the dispersion slurry in the pressure-resistant container is released into the low-pressure region and (ii) controlling the pressure through introducing carbon dioxide, nitrogen, air, or a substance used as a foaming agent, into the pressure-resistant container also while the dispersion slurry in the pressure-resistant container is being released into the low-pressure region.

The expansion ratio of the expanded polyolefin resin particles in accordance with one or more embodiments of the present invention is not particularly limited, and may be 3 times or more to 60 times or less. If the expansion ratio of the expanded polyolefin resin particles is less than 3 times, then reductions in weight of a molded product tend to be insufficient. If the expansion ratio of the expanded polyolefin resin particles is more than 60 times, then mechanical strength of a molded product tend to be impractical.

The average cell diameter of the expanded polyolefin resin particles in accordance with one or more embodiments of the present invention may be 80 μm or more and 500 μm or less, 90 μm or more and 360 μm or less, or 105 μm or more and 330 μm or less. If the average cell diameter of the expanded polyolefin resin particles is less than 80 μm, there is a tendency that the surface appearance of the polyolefin resin in-mold expanded molded product deteriorates and the compressive strength also decreases. If the average cell diameter is more than 500 μm, there is a tendency that the uniformity of the cell diameters decreases and also there is a tendency that the surface appearance of the polyolefin resin in-mold expanded molded product also deteriorates. Furthermore, there is a tendency that, in the case where an average cell diameter more than 500 μm is intended, the high-temperature heat quantity ratio (described later) should be reduced. In such a case, there is a tendency that the compressive strength of the polypropylene resin in-mold expanded molded product decreases.

The average cell diameter of the expanded polyolefin resin particles can be controlled by, for example, adjusting the high-temperature heat quantity ratio (described later). The average cell diameter tends to be large when the high-temperature heat quantity ratio is less than 15% and small when the high-temperature heat quantity ratio is more than 50%.

Figure 2:
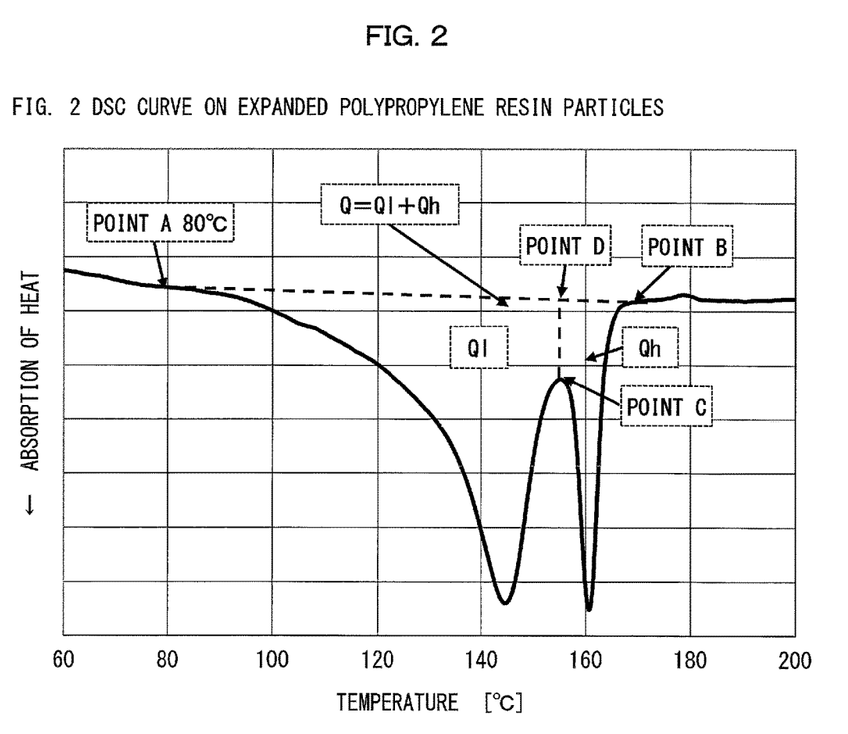
FIG. 2 shows an example of the measurement result on expanded polyolefin resin particles (specifically, expanded polypropylene resin particles) according to one or more embodiments of the present invention obtained using DSC.

According to one or more embodiments of the present invention, expanded polyolefin resin particles are those which have, on a DSC curve obtained by differential scanning calorimetry (DSC) in which the temperature was raised at a heating rate of 10° C./min., at least two melting peaks and at least two melting heat quantities which are the low temperature-side melting heat quantity (Q1) and the high temperature-side melting heat quantity (Qh) as shown in FIG. 2. This is because such expanded polyolefin resin particles can be processed in various manners in the in-mold foaming molding step and the physical properties of the resulting expanded product improve.

The expanded polyolefin resin particles having at least two melting peaks may be readily obtained by, in the method of producing expanded polyolefin resin particles in an aqueous dispersion system mentioned earlier, appropriately adjusting the temperature inside the pressure-resistant container during foaming to a proper value and maintaining the temperature for a certain period of time.

Specifically, in the case where the melting point of a polyolefin resin (base material resin) is Tm (° C.) and the melt end temperature of the polyolefin resin is Tf (° C.), normally the temperature inside the pressure-resistant container during foaming may be Tm−8 (° C.) or higher, Tm−5 (° C.) or higher and Tm+4 (° C.) or lower, or Tm−5 (° C.) or higher and Tm+3 (° C.) or lower. Furthermore, the period of time during which the temperature inside the pressure-resistant container is maintained for foaming may be 1 min. or longer and 120 min. or shorter, or 5 min. or longer and 60 min. or shorter.

An entire melting heat quantity (Q), a low temperature-side melting heat quantity (Q1), and a high temperature-side melting heat quantity (Qh) of expanded polyolefin resin particles of one or more embodiments of the present invention are defined as follows by use of FIG. 2. In the DSC curve obtained (FIG. 2), the entire melting heat quantity (Q=Q1+Qh), which is the sum of the low temperature-side melting heat quantity (Q1) and the high temperature-side melting heat quantity (Qh), is indicated by a part surrounded by a (i) line segment A-B which is drawn so as to connect a heat absorption quantity (point A) at a temperature of 80° C. and a heat absorption quantity (point B) at a temperature at which melting on a high temperature side ends and (ii) the DSC curve. The low temperature-side melting heat quantity (Q1) is indicated by a part surrounded by a line segment A-D, a line segment C-D, and the DSC curve, and the high temperature-side melting heat quantity (Qh) is indicated by a part surrounded by a line segment B-D, the line segment C-D, and the DSC curve where (i) a point C is a point at which a heat absorption quantity between two melting heat quantity regions in the DSC curve is the smallest, the two melting heat quantity regions being a region of the low temperature-side melting heat quantity and a region of the high temperature-side melting heat quantity and (ii) a point D is a point at which the line segment A-B intersects a line that is drawn so as to extend, parallel to a Y-axis, from the point C toward the line segment A-B.

The expanded polyolefin resin particles in accordance with one or more embodiments of the present invention have a ratio of the high temperature-side melting heat quantity (Qh) to the entire melting heat quantity [={Qh/(Ql+Qh)}× 100(%)] (hereinafter also referred to as "high-temperature heat quantity ratio"), which ratio may be 10% or more to 40% or less, 12% or more to 30% or less, or 15% or more to 25% or less. If the high-temperature heat quantity ratio of the expanded polyolefin resin particles is less than 10%, the compressive strength of the molded product obtained by in-mold foaming molding is low and the practical rigidity tends to decrease, and the average cell diameter of the expanded polyolefin resin particles also tends to become too large. If the high-temperature heat quantity ratio is more than 50%, there is a tendency that the compressive strength of the in-mold expanded molded product becomes large but the expansion power of the expanded polyolefin resin particles is too low and the in-mold expanded molded product as a whole is poorly fused or a high molding temperature (steam pressure) is required for fusion, and the average cell diameter of the expanded polyolefin resin particles also tends to become small.

The high-temperature heat quantity ratio of the expanded polyolefin resin particles can be adjusted as appropriate by, for example, (i) a retention time at the temperature in the pressure-resistant container (i.e. a retention time that (a) starts from a time point at which the polyolefin resin particles reach a desired temperature in the pressure-resistant container and (b) ends at time point at which the polyolefin resin particles foam, (ii) a foaming temperature (which is a temperature during foaming and which may or may not be identical to the temperature in the pressure-resistant container), (iii) foaming pressure (pressure during foaming), or the like. In general, a high-temperature heat quantity ratio or a heat quantity at the high temperature-side melting peak tends to become large by extending a retention time, decreasing a foaming temperature, or/and decreasing foaming pressure. Because of these factors, conditions to obtain a desired high-temperature heat quantity ratio can be easily found by conducting several experiments in which a retention time, a foaming temperature, or/and a foaming pressure is systematically changed. Note that the foaming pressure can be adjusted by adjusting the amount of a foaming agent.

In one or more embodiments of the present invention, the pressure-resistant container into which the polyolefin resin particles are dispersed is not limited to any particular one, provided that the pressure-resistant container is capable of resisting a pressure inside the container and a temperature inside the container during production of the expanded particles. Examples of the pressure-resistant container encompass an autoclave-type pressure-resistant container.

An aqueous dispersion medium for use in one or more embodiments of the present invention may be a dispersion medium composed only of water. Alternatively, the aqueous dispersion medium can also be an aqueous dispersion medium obtained by adding methanol, ethanol, ethylene glycol, glycerin, or the like to water. In a case where the polyolefin resin particles of one or more embodiments of the present invention contain a hydrophilic compound, the water in the aqueous dispersion medium serves also as a foaming agent. This contributes to an increase in expansion ratio.

The foaming agent for use in one or more embodiments of the present invention is, for example, an inorganic gas such as air, nitrogen, or carbon dioxide, and/or water or the like, because they have small environmental impact and no dangerous inflammability. These foaming agents may be used individually or two or more of them may be used in combination. In one or more embodiments of the present invention, carbon dioxide, and/or water may be used.

In one or more embodiments of the present invention, a dispersing agent or/and a dispersion auxiliary agent in an aqueous dispersion medium may be used in order to prevent polyolefin resin particles from adhering to each other.

Examples of the dispersing agent encompass inorganic dispersion agents such as tertiary calcium phosphate, tertiary magnesium phosphate, basic magnesium carbonate, calcium carbonate, barium sulfate, kaolin, talc, and clay. These inorganic dispersion agents can be used individually, or two or more of these inorganic dispersion agents can be used in combination.

Examples of the dispersion auxiliary agent encompass: (i) anionic surfactants of carboxylate type, (ii) anionic surfactants of sulfonate type such as alkylsulfonic acid salt, n-paraffin sulfonate salt, alkyl benzene sulfonate, alkyl naphthalene sulfonate, and sulfosuccinate, (iii) anionic surfactants of sulfate ester type such as sulfonated oil, alkyl sulfate salt, alkyl ether sulfate, and alkyl amide sulfate, and (iv) anionic surfactants of phosphate ester type such as alkyl phosphate, polyoxyethylene phosphate, and alkyl allyl ether sulfate. These dispersion auxiliary agents can be used individually or two or more of these dispersion auxiliary agents can be used in combination.

Of these, the following may be used in combination: (i) at least one dispersing agent selected from the group consisting of tertiary calcium phosphate, tertiary magnesium phosphate, barium sulfate, and kaolin; and (ii) a dispersion auxiliary agent which is n-paraffin sodium sulfonate.

In one or more embodiments of the present invention, an aqueous dispersion medium may be used in an amount of equal to or greater than 100 parts by weight and equal to or less than 500 parts by weight with respect to 100 parts by weight of polyolefin resin particles so that dispensability of the polyolefin resin particles in the aqueous dispersion medium is good. The respective amounts of dispersing agent and dispersion auxiliary agent vary, depending on (i) the types of the dispersing agent and the dispersion auxiliary agent and (ii) the type of and amount of polyolefin resin particles used. Ordinarily, with respect to 100 parts by weight of polyolefin resin particles, the dispersing agent may be used in an amount of 0.2 parts by weight or more to 3 parts by weight or less, and the dispersion auxiliary agent may be used in an amount of 0.001 parts by weight or more to 0.1 parts by weight or less.

The step of thus obtaining expanded polyolefin resin particles from polyolefin resin particles may be referred to as "first-step expansion process", and the expanded polyolefin resin particles thus obtained may be referred to as "first-step expanded particles".

An expansion ratio of first-step expanded particles may not reach 10 times, depending on foaming conditions such as foaming temperature, foaming pressure, and the type of foaming agent in the production. In such a case, expanded polyolefin resin particles whose expansion ratio is increased in comparison with that of first-step expanded particles can be obtained by, for example, (i) applying an internal pressure to the first-step expanded particles by impregnation of inorganic gas (e.g. air, nitrogen, carbon dioxide) and then (ii) causing the first-step expanded particles to come into contact with steam having a certain pressure.

The step of thus further foaming the expanded polyolefin resin particles so as to obtain expanded polyolefin resin particles having a high expansion ratio may be referred to as "second-step expansion process". Expanded polyolefin resin particles thus obtained through the second-step expansion process may be referred to as "second-step expanded particles".

In one or more embodiments of the present invention, a pressure of steam in the second-step expansion process may be adjusted 0.04 MPa (gage pressure) or more to 0.25 MPa (gage pressure) or less, or 0.05 MPa (gage pressure) or more to 0.15 MPa (gage pressure) or less, in view of the expansion ratio of the second-step expanded particles.

If the pressure of steam in the second-step expansion process is less than 0.04 MPa (gage pressure), then the expansion ratio is less likely to increase. If the pressure is more than 0.25 MPa (gage pressure), then second-step expanded particles to be obtained tend to adhere to each other, so that it becomes impossible to use the second-step expanded particles for subsequent in-mold foaming molding.

An internal pressure of air to be impregnated into the first-step expanded particles may be (i) made to change as appropriate in view of (a) the expansion ratio of the second-step expanded particles and (b) steam pressure in the second-step expansion process and (ii) 0.2 MPa or more (absolute pressure) to 0.6 MPa or less (absolute pressure).

If the internal pressure of air to be impregnated into the first-step expanded particles is less than 0.2 MPa (absolute pressure), then steam having a high pressure is necessary to increase the expansion ratio, so that the second-step expanded particles tend to adhere to each other. If the internal pressure of air to be impregnated into the first-step expanded particles is more than 0.6 MPa (absolute pressure), then the second-step expanded particles tend to become an open-cell foam. In such a case, rigidity, such as compressive strength, of an in-mold expanded molded product tends to decrease.

The expanded polyolefin resin particles in accordance with one or more embodiments of the present invention can be made into a polyolefin resin in-mold expanded molded product by a known in-mold foaming molding method.

Examples of an in-mold foaming molding method encompass:

i) a method of (a) subjecting expanded polyolefin resin particles to a pressure treatment with the use of inorganic gas (e.g. air, nitrogen, carbon dioxide) so that the expanded polyolefin resin particles, into which the inorganic gas is impregnated, has a certain internal pressure and thereafter (b) filling a mold with the expanded polyolefin resin particles, and (c) heating the mold by steam so that the expanded polyolefin resin particles are fused to each other, ii) a method of (a) compressing expanded polyolefin resin particles by gas pressure, (b) filling a mold with the expanded polyolefin resin particles, and (c) heating the mold by steam so that the expanded polyolefin resin particles are fused to each other using the shape recovery force of the expanded polyolefin resin particles, and iii) a method of (a) filling a mold with expanded polyolefin resin particles without any particular pretreatment and (b) heating the mold by steam so that the expanded polyolefin resin particles are fused to each other.

The polyolefin resin in-mold expanded molded product thus obtained may be used in various applications such as heat insulators, shock-absorbing packing materials, returnable containers, car interior materials (e.g., toolboxes, floor core materials, and the like), and core materials for car bumpers.

The polyolefin resin expanded molded product obtained by one or more embodiments of the present invention prevents or reduces annoying high-frequency frictional sound when expanded molded products are rubbed against each other or the expanded molded product is rubbed against some other plastic product or metal product or the like. In particular, the polyolefin resin in-mold expanded molded product of one or more embodiments of the present invention prevents or reduces annoying high-frequency frictional sound (squeaky sound) when the expanded molded product and some other plastic product or metal product or the like are rubbed together and thus is suitable for use in applications of car interior materials, returnable containers for electric or electronic components, and the like. Furthermore, the polyolefin resin in-mold expanded molded product of one or more embodiments of the present invention is also highly water repellent and thus is suitable for use in applications of returnable containers which are to be cleaned and reused, such as vegetable boxes, and the like.

One or more embodiments of the present invention may be arranged as below.

<1> An expanded polyolefin resin particle obtained by expanding, by using water and/or an inorganic gas as a foaming agent, a polyolefin resin particle composed of a polyolefin resin composition that contains: a product (b); and a water absorbing substance (c). The product (b) is obtained by heating and kneading, into a polyolefin resin (a), a mixture of a polypropylene resin (1), a polypropylene wax (2), a polyorganosiloxane (3) containing at least one silicon-atom-bound radical polymerizable functional group per molecule, and an organic peroxide (4).

<2> The expanded polyolefin resin particle according to <1>, wherein the polyolefin resin composition further contains a non-radical polymerizable polyorganosiloxane (d).

<3> The expanded polypropylene resin particle according to <1> or <2>, wherein the polyolefin resin (a) is a polypropylene resin.

<4> The expanded polyolefin resin particle according to any one of <1> to <3>, wherein the water absorbing substance (c) is at least one selected from the group consisting of melamine, glycerols, and zinc borate.

<5> The expanded polyolefin resin particle according to any one of <1> to <4>, which contains the product (b) in an amount of 0.5 parts by weight or more and 15 parts by weight or less with respect to 100 parts by weight of the polyolefin resin (a), the product (b) being a product in which the polyorganosiloxane is grafted on the polypropylene resin and the polypropylene wax.

<6> The expanded polyolefin resin particle according to any one of <1> to <5>, which contains the water absorbing substance (c) in an amount of 0.01 parts by weight or more and 1 part by weight or less with respect to 100 parts by weight of the polyolefin resin (a).

<7> The expanded polyolefin resin particle according to any one of <2> to <6>, which contains the non-radical polymerizable polyorganosiloxane (d) in an amount of 10 parts by weight or more and 60 parts by weight or less with respect to 100 parts by weight of the product (b) in which the polyorganosiloxane is grafted on the polypropylene resin and the polypropylene wax.

<8> A method for producing expanded polyolefin resin particles including: dispersing polyolefin resin particles along with a foaming agent into an aqueous dispersion medium in a closed vessel; heating an inside of the closed vessel to a temperature equal to or higher than a softening temperature of the polyolefin resin particles and subjecting the closed vessel to pressure; and thereafter releasing, to a region having a pressure lower than an internal pressure of the closed vessel, the aqueous dispersion medium in which the polyolefin resin particles and the foaming agent are dispersed, to obtain the expanded polyolefin resin particles, wherein the expanded polyolefin resin particles are composed of a polyolefin resin composition that contains 0.5 parts by weight or more and 15 parts by weight or less of a product (b) obtained by heating and kneading a mixture of a polypropylene resin (1), a polypropylene wax (2), a polyorganosiloxane (3) containing at least one silicon-atom-bound radical polymerizable functional group per molecule, and an organic peroxide (4), and 0.01 parts by weight or more and 1 part by weight or less of a water absorbing substance (c) with respect to 100 parts by weight of a polyolefin resin (a), and the foaming agent is water and/or an inorganic gas.

EXAMPLES

The following description will discuss one or more embodiments of the present invention in more detail with Examples and Comparative Examples. Note, however, that one or more embodiments of the present invention are not limited to these Examples and Comparative Examples.

Substances used in Examples and Comparative Examples are as provided below.

<1. Polyolefin Resin (a) (Specifically, Polypropylene Resin)>

Butene-ethylene-propylene random copolymer [product name: E309M, available from Prime Polymer Co., Ltd., MI=10 g/10 min., Tm=149° C., 1-butene content: 3.8 wt %, ethylene content: 0.5 wt %]

<2. Product (b) Obtained by Heating and Kneading Mixture Containing Polypropylene Resin (1), Polypropylene Wax (2), Polyorganosiloxane (3) Containing at Least One Silicon-Atom-Bound Radical Polymerizable Functional Group Per Molecule, and Organic Peroxide (4)>

Sample A: Sample A was prepared in the following manner.

A two-screw extruder (TEK45 available from O.N.MACHINERY CO., LTD) in which barrel (C1 to C9, H/D) temperatures were set at 80° C. to 200° C. (C1=80° C., C2=150° C., C3=160° C., C4=180° C., C5 to C9=200° C., H/D=200° C.) and the screw rotation speed was set at 200 rpm was used.

Specifically, 75 parts by weight of Prime Polypro J-105G [homoPP available from Prime Polymer Co., Ltd., MFR=9 g/10 min.] as a polypropylene resin (1), 25 parts by weight of Biscol 330-P [available from Sanyo Chemical Industries, Ltd., molecular weight: 15000] as a polypropylene wax (2), and 0.8 parts by weight of 2,5-dimethyl-2,5-di-(t-butylperoxy) hexane) [available from ARKEMA Yoshitomi, Ltd., product name: LUPEROX 101] as an organic peroxide (4) were fed into the two-screw extruder through a material feed opening, and then 100 parts by weight of a polydimethylsiloxane with both ends terminated with dimethylvinylsiloxane [product name: XF40A-1987 available from Momentive Performance Materials Japan LLC] as a polyorganosiloxane (3) containing at least one silicon-atom-bound radical polymerizable functional group per molecule was fed into the two-screw extruder through the barrel C3 with the use of a liquid adding machine, and then the materials in the two-screw extruder were melt and kneaded to obtain Sample A. The graft rate of Sample A was 90%.

<3. Sample that Contains Product (b), which is Obtained by Heating and Kneading Mixture Containing Polypropylene Resin (1), Polypropylene Wax (2), Polyorganosiloxane (3) Containing at Least One Silicon-Atom-Bound Radical Polymerizable Functional Group Per Molecule, and Organic Peroxide (4), and Non-Radical Polymerizable Polyorganosiloxane (d)>

Sample B: Sample B was prepared in the following manner.

A two-screw extruder (TEK45 available from O.N.MACHINERY CO., LTD) in which the barrel (C1 to C9, H/D) temperatures were set at 80° C. to 200° C. (C1=80° C., C2=150° C., C3=160° C., C4=180° C., C5 to C9=200° C., H/D=200° C.) and the screw rotation speed was set at 200 rpm was used. Specifically, 200.8 parts by weight of Sample A was fed into the two-screw extruder through the material feed opening, and 50 parts by weight of a polydimethylsiloxane [Product name: TSF451-50 available from Momentive Performance Materials Japan LLC] as a non-radical polymerizable polyorganosiloxane (d) was fed into the two-screw extruder through the barrel C3 with the use of a liquid adding machine, and then the materials in the two-screw extruder were melt and kneaded to obtain Sample B. The graft rate of Sample B was 90%.

A commercially available product was also used as Sample B. Specifically, Rikeeido SG-100P [available from Riken Vitamin Co., Ltd., the non-radical polymerizable polyorganosiloxane (d) is contained in an amount of 10 wt %] or Rikeeido SG-170P [available from Riken Vitamin Co., Ltd., the non-radical polymerizable polyorganosiloxane (d) is contained in an amount of 28 wt %] was used as Sample B.

<4. Water Absorbing Substance (c)>

Polyethylene glycol [PEG#300 available from Lion Corporation]

<5. Expansion Nucleating Agent>

Talc [Talcan Powder PK-S available from Hayashi-Kasei Co., Ltd.]

<6. Polysiloxane>

Polysiloxane masterbatch [available from Dow Corning Toray Co., Ltd., product name: BY-001S; polysiloxane content: 50 wt %, base material resin is homopolypropylene]

The evaluations on Examples and Comparative Examples were performed in the following manner.

(Measurement of Melting Point Tm of Polypropylene Resin (or Base Material Resin))

The melting point Tm of the polypropylene resin was measured with the use of a differential scanning calorimeter DSC (manufactured by Seiko Instruments Inc., model: DSC6200). Specifically, the melting point Tm was found as a melting peak temperature in a second temperature rise on a DSC curve obtained by (i) raising a temperature of 5 mg to 6 mg of the polypropylene resin (polypropylene resin particles) from 40° C. to 220° C. at a heating rate of 10° C./min. so as to melt the polypropylene resin, and thereafter (ii) lowering the temperature from 220° C. to 40° C. at a cooling rate of 10° C./min. so as to crystallize the resin, and then (iii) raising the temperature again from 40° C. to 220° C. at a heating rate of 10° C./min to melt the resin. (see Tm in FIG. 1).

(Calculation of High-Temperature Heat Quantity Ratio of Expanded Polypropylene Resin Particles)

A high-temperature heat quantity ratio $[=\{Qh/(Q1+Qh)\}\times 100(\%)]$ was calculated based on a DSC curve (refer to FIG. 2) obtained with the use of a differential scanning calorimeter (manufactured by Seiko Instruments Inc., model: DSC6200) by raising a temperature of 5 mg to 6 mg of the expanded polypropylene resin particles from 40° C. to 220° C. at a heating rate of 10° C./min. As shown in FIG. 2, on the obtained DSC curve, an entire melting heat quantity (Q=Q1+Qh), which is the sum of a low temperature-side melting heat quantity (Q1) and a high temperature-side melting heat quantity (Qh), is indicated by a part surrounded by a (i) line segment A-B which is drawn so as to connect a heat absorption quantity (point A) at a temperature of 80° C. and a heat absorption quantity (point B) at a temperature at which melting on a high temperature side ends and (ii) the DSC curve. The low temperature-side melting heat quantity (Q1) is indicated by a part surrounded by a line segment A-D, a line segment C-D, and the DSC curve, and the high temperature-side melting heat quantity (Qh) is indicated by a part surrounded by a line segment B-D, the line segment C-D, and the DSC curve where (i) a point C is a point at which a heat absorption quantity between two melting heat quantity regions in the DSC curve is the smallest, the two melting heat quantity regions being a region of the low temperature-side melting heat quantity and a region of the high temperature-side melting heat quantity and (ii) a point D is a point at which the line segment A-B intersects a line that is drawn so as to extend, parallel to a Y-axis, from the point C toward the line segment A-B.

(Expansion Ratio of Expanded Polypropylene Resin Particles)

Approximately 3 g or more to 10 g or less of the expanded polypropylene resin particles obtained was weighed, and dried at 60° C. for 6 hours, and were then subjected to conditioning indoors at 23° C. and at a humidity of 50%. Then, after the weight w (g) of the expanded polypropylene resin particles was measured, the volume v (cm$^3$) of the expanded polypropylene resin particles was measured by an immersing the resultant particles, so that an absolute specific gravity (ρb=w/v) of the expanded polypropylene resin particles was obtained. Then, based on a ratio of the absolute specific gravity to a density (ρr) of the polypropylene resin particles before foaming, an expansion ratio (K=ρr/ρb) was calculated. Note that in each of Examples and Comparative Examples below, the density (ρr) of the polypropylene resin particles before foaming was 0.90 g/cm$^3$.

(Bulk Density of Expanded Polypropylene Resin Particles)

Expanded polypropylene resin particles were gently poured into a vessel having a volume of about 10 L to fill the vessel, and thereafter the weight of the expanded polypropylene resin particles in the vessel was measured, and the measured weight was divided by the volume of the vessel. The obtained value in g/L was used as a bulk density.

(Average Cell Diameter of Expanded Polypropylene Resin Particle)

While caution was exercised so that a foam membrane (cell membrane) in an expanded polypropylene resin particle obtained would not be destroyed, the expanded particle was cut substantially through a center part, and then a cross section was observed with the use of a microscope (manufactured by Keyence Corporation: VHX digital microscope). A line segment, a length of which corresponds to 1000 μm, was drawn on an entire portion of a photograph captured by the microscope for observation except a portion of a surface layer of the expanded particle. Then, the number (n) of cells on which the line segment passes was counted, so that a cell diameter was calculated in 1000/n (μm). Such operations were carried out for 10 expanded particles, and an average value of respective cell diameters of cells calculated in the 10 operations was regarded as an average cell diameter of the expanded polypropylene resin particles.

(Moldability Evaluation)

With the use of a polyolefin foaming molding machine (manufactured by DAISEN Co., Ltd., KD-345), (i) a mold, which allows a block-shape in-mold expanded molded product having a size of length 300 mm×width 400 mm×thickness 50 mm to be obtained with a gap of 5 mm in the mold, was filled with expanded polypropylene resin particles which had been prepared in advance so as to have an internal air pressure as shown in Table 1 and (ii) the expanded particles were heat molded by being compressed by 10% in thickness-wise directions. This resulted in a block-shape polypropylene resin in-mold expanded molded product having a size of length 300 mm×width 400 mm×thickness 50 mm. In doing so, the air in the mold was first purged by use of steam having a pressure of 0.1 MPa (gage pressure) (preheating step), and thereafter the expanded polypropylene resin particles were heat molded (cross steaming step, counter cross steaming step, autoclave step) by use of heating steam having a certain molding pressure. It should be noted that, in the autoclave step, the in-mold expanded molded product was prepared while the molding pressure (steam pressure) was changed from 0.26 MPa (gage pressure) in increments of 0.01 MPa. Further note that the preheating step was performed for 3 seconds, the cross steaming step was performed for 7 seconds, the counter cross steaming step was performed for 5 seconds, and the autoclave step was performed for 10 seconds. The polypropylene resin in-mold expanded molded product obtained was (i) left at room temperature for 1 hour, (ii) cured and dried in a thermostatic chamber at 75° C. for 3 hours, and (iii) brought out and left at room temperature for 24 hours. Then, fusibility and a surface appearance were evaluated.

(Fusibility)

The in-mold expanded molded product thus obtained was (i) notched by 5 mm in a thickness-wise direction with the use of a cutter and (ii) cleaved by hand. A cleaved surface was observed by visual inspection, and a percentage of clefts in expanded particles and not clefts in the interfaces of the expanded particles was obtained. Then, fusibility was judged by the following criteria:

E (Excellent): The percentage of clefts in the expanded particles was 80% or more.
G (Good): The percentage of clefts in the expanded particles was 60% or more to less than 80%.
F (Failed): The percentage of clefts in the expanded particles was less than 60% (fusibility was so low that the percentage of clefts appearing in the interfaces of the expanded particles on the cleaved surface was more than 40%).

It should be noted that the fusibility in Table 1 was evaluated on an in-mold expanded molded product obtained under the condition where autoclave pressure (steam pressure) was 0.30 MPa (gage pressure). Further note that, in the case where a molded product was prepared while the autoclave pressure was changed, the autoclave pressure (steam pressure) at which the fusibility (percentage of clefts in expanded particles) first reached 60% was used as a minimum heating steam pressure for molding (gage pressure).

(Surface Appearance)

A surface having a length of 300 mm and a width of 400 mm of the in-mold expanded molded product obtained was observed by visual inspection, and a surface property was judged by the following criteria:

E (Excellent): There is hardly any inter-particle space (spaces between expanded polypropylene resin particles); there is no noticeable surface unevenness; there is no wrinkle or shrinkage and the surface is therefore beautiful.
G (Good): Some inter-particle spaces, surface unevenness, shrinkage, or wrinkles are observed.
F (Failed): Inter-particle spaces, surface unevenness, shrinkage, or wrinkles are noticeable throughout the surface observed.

(Density of Molded Product)

A test piece, which had a size of length 50 mm×width 50 mm×thickness 25 mm, was cut out from substantially a center part of the in-mold expanded molded product obtained. Note that a thickness of approximately 12.5 mm was removed from each of the front and back surface layers of the in-mold expanded molded product to obtain the test piece having a thickness of 25 mm. The weight W (g) of the test piece was measured, and the length, width, and thickness of the test piece were measured with the use of a caliper, so that a volume V ($cm^3$) of the test piece was calculated. Then, the density of the molded product was obtained by W/V. Note, however, that a conversion was made so that the unit was g/L.

(Effect of Preventing Frictional Sound from Expanded Molded Product)

1) Evaluation of Effect of Preventing Frictional Sound (Frictional Sound Evaluation-1)

A flat surface of a block-shape polypropylene resin in-mold expanded molded product having a size of length 300 mm×width 400 mm×thickness 40 mm was brought into contact with a corner of another block-shape polypropylene resin expanded molded product prepared separately, and the corner was moved back and forth without being detached from the flat surface and thereby the polypropylene resin expanded molded products were rubbed together. The sound generated from the rubbing was checked in a close position. Whether frictional sound was generated or not was checked. Sound was judged by the following criteria.
E (Excellent): No frictional sound is generated.
G (Good): Almost no frictional sound is generated, but small frictional sound is generated when the corner is moved several times.
P (Poor): Large frictional sound is generated when the corner is moved.
F (Failed): Large frictional sound is generated when expanded molded products are simply brought into contact with each other.

2) Evaluation of Continuous Effect of Preventing Frictional Sound (Frictional Sound Evaluation-2)
The continuous effect of preventing frictional sound from an expanded molded product was evaluated by checking frictional sound before the expanded molded product was cleaned and frictional sound after the expanded molded product was cleaned. It should be noted, here, that the expanded molded product is determined as having the continuous effect of preventing frictional sound when there is no difference between the frictional sound before cleaning and that after cleaning.
The cleaning operation was wiping a surface of a polypropylene resin expanded molded product 10 times with absorbent cotton immersed in methyl ethyl ketone. The evaluation was performed in accordance with the same criteria as those of 1).

(Evaluation of Frictional Sound: Frictional Sound Evaluation by Sliding Polyolefin Resin in-Mold Expanded Molded Product on Injection-Molded PP Plate)

A sample piece having a size of length 50 mm×width 50 mm×thickness 40 mm was cut from the obtained expanded molded product so as to have a skin layer on one side. It should be noted that the sample piece was cut in a manner such that the surface of the expanded molded product, from which the sample piece was cut, was partially left as part of the surface of the sample piece. The term "skin layer" mentioned above denotes a part of the surface of the sample piece which used to constitute the surface of the original expanded molded product. Using a surface property tester (HEIDON Type 14 available from Shinto Scientific Co., Ltd.), the sample piece was set in the tester in a manner such that the skin layer of the sample piece was in contact with the top of the injection-molded PP plate. A weight of 0.75 kg was placed on top of the sample piece and the sample piece was allowed to stand in this condition for 60 seconds. After 60 seconds, the sample piece was moved 5 mm back and forth at 6000 mm/min. and thereby the polyolefin resin in-mold expanded molded product and the injection-molded PP plate were rubbed together. Frictional sound was collected with a microphone placed 10 cm apart from the place where the molded product and the PP plate were rubbed together. The collected sound was analyzed for frequency and sound pressure level with the use of a realtime analyzer DSSF3 Light available from Yoshimasa Electronic Inc., and an average sound pressure level (sound A) at a frequency of 8000 Hz after 60 seconds from the start of the rubbing and an average sound pressure level (sound B) at a frequency of 8000 Hz after 60 seconds of operation of the tester without rubbing of expanded molded products were found. A value found using the following equation was used as a frictional sound pressure. The results are shown in Table 1.

Frictional sound pressure (dB)=sound
A (dB)–sound B (dB)       Equation (Evaluation of Water Repellency)

1) Evaluation of Water Repellency (Contact Angle-1)

Water repellency was evaluated on the basis of a contact angle on a surface of the obtained polypropylene resin in-mold expanded molded product measured by a θ/2 method with the use of a contact angle meter [model: CA-X available from Kyowa Interface Science Co., LTD]. A comparison was made between the contact angle on the surface of the obtained polypropylene resin in-mold expanded molded product and the contact angle on a polyolefin resin composition molded product containing no surface modifier (Comparative Example 1) and the effect of water repellency was evaluated. It should be noted, here, that a larger contact angle means better water repellency. The results are shown in Table 1.

2) Evaluation of Continuous Water Repellency (Contact Angle-2)

Continuous water repellency was evaluated by measuring the contact angle before cleaning operation and that after cleaning operation and making a comparison between the values of the contact angles. It should be noted, here, that the molded product is determined as having continuous water repellency when there is no difference between the contact angles before and after the cleaning operation. The cleaning operation was wiping a surface of a polypropylene resin composition molded product 10 times with absorbent cotton immersed in methyl ethyl ketone. The results are shown in Table 1.

(50%-Strained Static Compressive Strength)

A test piece having a size of length 50 mm×width 50 mm×thickness 25 mm was cut from an expanded molded product obtained with the use of a block-shape mold, and, with the use of a tension and compression testing machine [available from Minebea, TG series], a compressive stress of the test piece when the test piece was compressed by 50% at a rate of 10 mm/min. was measured in accordance with NDS Z 0504. It should be noted that the compressive stress of the test piece when the test piece is compressed by 50% is a measure of the rigidity of the in-mold expanded molded product. The results of measurements are shown in Table 1 as values of when the density of the molded product is 30 g/L.

Examples 1 Through 14

[Production of Polypropylene Resin Particles]

Polypropylene resins and additives were mixed in amounts shown in Table 1 with the use of a blender. Each of the mixtures obtained was melted and kneaded at a resin temperature of 220° C. and extruded in a strand shape with the use of a twin-screw extruder (manufactured by 0. N. Machinery Co., Ltd., TEK45). The strand thus extruded was water-cooled in a water tank having a length of 2 m, and was then cut. This resulted in polypropylene resin particles (1.2 mg per particle).

[Production of First-Step Expanded Particles]

100 parts by weight of the polypropylene resin particles obtained, 200 parts by weight of water, 1.2 parts by weight of powdered basic tribasic calcium phosphate as a dispersing agent, 0.07 parts by weight of n-paraffin sodium sulfonate as a dispersion auxiliary agent, and an amount shown in Table 1 of carbon dioxide as a foaming agent were placed in a 10 L-pressure-resistant container. While the mixture was stirred, the temperature of the mixture was raised to a foaming temperature shown in a corresponding part in Table 1 and the mixture was retained for 10 min. Then, carbon dioxide was additionally injected into the pressure-resistant container so that a foaming pressure was adjusted to a value shown in a corresponding part in Table 1. Then, the foaming pressure was retained for 20 min. Then, a valve at a lower part of the pressure-resistant container was opened while carbon dioxide was injected into the pressure-resistant container such that the temperature and pressure in the pressure-resistant container were retained. An aqueous dispersion medium was released from the valve into air under atmospheric pressure through an orifice plate having an opening diameter of 3.6 mm, so that expanded polypropylene resin particles (first-step expanded particles) were obtained. The entire melting heat quantity, high temperature-side melting heat quantity, low temperature-side melting heat quantity, high-temperature heat quantity ratio, expansion ratio, bulk density, and cell diameter of the first-step expanded particles thus obtained were measured. The results are shown in Table 1.

[Production of in-Mold Expanded Molded Product]

The expanded polypropylene resin particles (first-step expanded particles) were introduced into a pressure-resistant container. Then, pressurized air was impregnated so that internal pressure of the expanded particles was adjusted in advance as shown in a corresponding part of Table 1. Then, (i) a mold, which allows a block-shape in-mold expanded molded product having a size of length 300 mm×width 400 mm×thickness 40 mm to be obtained, was filled with the expanded polypropylene resin particles (first-step expanded particles) while cracking was 4 mm, which expanded polypropylene resin particles had the adjusted internal pressure and (ii) the expanded particles were heat molded by being compressed by 10% in thickness-wise directions. This resulted in a block-shape polypropylene resin in-mold expanded molded product having a size of length 300 mm×width 400 mm×thickness 40 mm. In doing so, after the mold was filled with the expanded polypropylene resin particles having the adjusted internal pressure and the mold was then completely closed, the air in the mold was first purged by use of steam of 0.1 MPa (gage pressure) (preheating step), and thereafter the particles were heat-molded (cross steaming step, counter steaming step, and autoclave step) with heating steam of a certain molding pressure, such that an in-mold expanded molded product was obtained. Note that the in-mold expanded molded product was prepared while a molding pressure (steam pressure) was changed from 0.26 MPa in 0.01 MPa increments in the autoclave step. Further, note that (i) the preheating step was carried out for 3 sec., (ii) the cross steaming step was carried out for 7 sec., (iii) the counter cross steaming step was carried out for 5 sec., and (iv) the autoclave step was carried out for 10 sec. The obtained molded product was evaluated for moldability and measured for density, frictional sound, frictional sound pressure, contact angle, and 50%-strained compressive strength. The results are shown in Table 1.

TABLE 1

|  |  |  |  | Examples | | | | | | |
|---|---|---|---|---|---|---|---|---|---|---|
|  |  |  |  | 1 | 2 | 3 | 4 | 5 | 6 | 7 |
| Polypropylene resin particles | Resin (a) | Polypropylene | parts by weight | 100 | 100 | 100 | 100 | 100 | 100 | 100 |
|  | Product (b) | Sample A | parts by weight | 2 | 5 | 10 | 0 | 0 | 0 | 0 |
|  | Product (b) + Component (d) | Commercially-available Sample B (Rikeeido SG-100P) | parts by weight | 0 | 0 | 0 | 2 | 5 | 10 | 5 |
|  |  | Commercially-available Sample B (Rikeeido SG-170P) | parts by weight | 0 | 0 | 0 | 0 | 0 | 0 | 0 |
|  |  | Sample B | parts by weight | 0 | 0 | 0 | 0 | 0 | 0 | 0 |
|  | Water absorbing substance (c) | Polyethylene glycol | parts by weight | 0.5 | 0.5 | 0.5 | 0.5 | 0.5 | 0.5 | 0.1 |
|  | Expansion nucleating agent | Talc | parts by weight | 0.1 | 0.1 | 0.1 | 0.1 | 0.1 | 0.1 | 0.1 |
|  | Polysiloxane | BY27-001S | parts by weight | 0 | 0 | 0 | 0 | 0 | 0 | 0 |

TABLE 1-continued

| | | | | | | | | | | |
|---|---|---|---|---|---|---|---|---|---|---|
| Expanded polypropylene particles | Foaming conditions | Initial amount of carbon dioxide | parts by weight | 5.8 | 5.8 | 5.8 | 5.8 | 5.8 | 5.8 | 5.8 |
| | | Initial amount of isobutane | parts by weight | — | — | — | — | — | — | — |
| | | Foaming temperature | ° C. | 149.0 | 149.0 | 149.0 | 148.9 | 149.0 | 149.0 | 148.7 |
| | | Foaming pressure (gage pressure) | MPa | 2.75 | 2.70 | 2.70 | 2.80 | 2.70 | 2.70 | 3.00 |
| | Quality | Entire melting heat quantity | J/g | 89.0 | 84.0 | 84.0 | 89.2 | 86.0 | 85.5 | 86.2 |
| | | High temperature-side melting heat quantity | J/g | 16.6 | 16.5 | 16.7 | 16.7 | 16.7 | 17.0 | 16.0 |
| | | Low temperature-side melting heat quantity | J/g | 72.0 | 71.0 | 70.0 | 72.5 | 89.2 | 68.0 | 70.0 |
| | | High-temperature heat quantity ratio | % | 18.7 | 19.6 | 19.9 | 18.7 | 19.4 | 19.9 | 18.6 |
| | | Expansion ratio | times | 22.0 | 20.0 | 20.0 | 22.1 | 20.0 | 20.0 | 21.0 |
| | | Bulk density | g/L | 25.0 | 26.9 | 27.0 | 24.9 | 26.9 | 26.9 | 26.0 |
| | | Cell diameter | μm | 95 | 104 | 145 | 90 | 104 | 150 | 90 |
| Polypropylene in-mold expanded molded product | Conditions for in-mold foaming | Internal pressure of expanded particles (absolute pressure) | MPa | 0.21 | 0.22 | 0.21 | 0.20 | 0.22 | 0.22 | 0.21 |
| | | Minimum heating steam pressure for molding (gage pressure) | MPa | 0.28 | 0.28 | 0.28 | 0.28 | 0.28 | 0.28 | 0.28 |
| | Evaluations of physical properties | Fusibility of molded product | — | E | E | E | E | E | E | E |
| | | Surface appearance of molded product | — | E | E | E | E | E | E | E |
| | | Density of molded product | g/L | 30.0 | 32.4 | 32.5 | 30.0 | 32.4 | 32.4 | 31.0 |
| | | Frictional sound evaluation-1 | — | E | E | E | E | E | E | E |
| | | Frictional sound evaluation-2 (after cleaning with methyl ethyl ketone) | — | E | E | E | E | E | E | E |
| | | Frictional sound pressure | dB | 23 | 23 | 20 | 24 | 22 | 19 | 22 |
| | | Contact angle-1 | ° | 101 | 101 | 102 | 101 | 101 | 102 | 101 |
| | | Contact angle-2 (after cleaning with methyl ethyl ketone) | ° | 100 | 101 | 102 | 101 | 101 | 102 | 101 |
| | | Compressive strength (when density of molded product is 30 g/L) | MPa | 0.278 | 0.277 | 0.274 | 0.28 | 0.274 | 0.274 | 0.275 |

| | | | | Examples | | | | | | |
|---|---|---|---|---|---|---|---|---|---|---|
| | | | | 8 | 9 | 10 | 11 | 12 | 13 | 14 |
| Polypropylene resin particles | Resin (a) | Polypropylene | parts by weight | 100 | 100 | 100 | 100 | 100 | 100 | 100 |
| | Product (b) | Sample A | parts by weight | 0 | 0 | 0 | 0 | 0 | 0 | 0 |
| | Product (b) + Component (d) | Commercially-available Sample B (Rikeeido SG-100P) | parts by weight | 0 | 0 | 0 | 0 | 0 | 0 | 0 |
| | | Commercially-available Sample B (Rikeeido SG-170P) | parts by weight | 2 | 5 | 10 | 10 | 0 | 0 | 0 |
| | | Sample B | parts by weight | 0 | 0 | 0 | 0 | 2 | 5 | 10 |
| | Water absorbing substance (c) | Polyethylene glycol | parts by weight | 0.5 | 0.5 | 0.5 | 0.5 | 0.5 | 0.5 | 0.5 |
| | Expansion nucleating agent | Talc | parts by weight | 0.1 | 0.1 | 0.1 | 0.1 | 0.1 | 0.1 | 0.1 |
| | Polysiloxane | BY27-001S | parts by weight | 0 | 0 | 0 | 0 | 0 | 0 | 0 |
| Expanded polypropylene particles | Foaming conditions | Initial amount of carbon dioxide | parts by weight | 5.8 | 5.8 | 5.0 | 5.4 | 5.8 | 5.8 | 5.8 |
| | | Initial amount of isobutane | parts by weight | — | — | — | — | — | — | — |
| | | Foaming temperature | ° C. | 148.9 | 148.9 | 149.3 | 149.2 | 149.0 | 148.9 | 149.0 |
| | | Foaming pressure (gage pressure) | MPa | 2.80 | 2.70 | 2.50 | 2.60 | 2.70 | 2.70 | 2.50 |
| | Quality | Entire melting heat quantity | J/g | 90.3 | 89.0 | 85.5 | 84.7 | 89.0 | 85.0 | 84.0 |
| | | High temperature-side melting heat quantity | J/g | 17.1 | 18.1 | 17.1 | 14.3 | 17.0 | 17.3 | 16.5 |
| | | Low temperature-side melting heat quantity | J/g | 73.2 | 71.3 | 68.4 | 70.4 | 69.0 | 69.0 | 68.0 |
| | | High-temperature heat quantity ratio | % | 18.9 | 20.3 | 20.0 | 16.9 | 19.1 | 20.4 | 19.6 |
| | | Expansion ratio | times | 17.2 | 19.5 | 20.5 | 23.3 | 19.0 | 19.5 | 21.0 |
| | | Bulk density | g/L | 26.7 | 28.2 | 27.2 | 23.2 | 28.5 | 28.2 | 26.0 |
| | | Cell diameter | μm | 98 | 123 | 163 | 170 | 105 | 123 | 180 |
| Polypropylene in-mold expanded molded product | Conditions for in-mold foaming | Internal pressure of expanded particles (absolute pressure) | MPa | 0.22 | 0.22 | 0.21 | 0.20 | 0.22 | 0.22 | 0.22 |
| | | Minimum heating steam pressure for molding (gage pressure) | MPa | 0.28 | 0.28 | 0.28 | 0.28 | 0.28 | 0.28 | 0.28 |
| | Evaluations of physical properties | Fusibility of molded product | — | E | E | E | E | E | E | E |
| | | Surface appearance of molded product | — | E | E | E | E | E | E | E |
| | | Density of molded product | g/L | 30.8 | 34.1 | 32.5 | 27.8 | 34.3 | 34.1 | 31.0 |
| | | Frictional sound evaluation-1 | — | E | E | E | E | E | E | E |
| | | Frictional sound evaluation-2 (after cleaning with methyl ethyl ketone) | — | E | E | E | E | E | E | E |

TABLE 1-continued

| | | | | | | | | | |
|---|---|---|---|---|---|---|---|---|---|
| Frictional sound pressure | dB | 24 | 22 | 19 | 19 | 23 | 22 | 19 | |
| Contact angle-1 | ° | 104 | 108 | 108 | 108 | 103 | 106 | 106 | |
| Contact angle-2 (after cleaning with methyl ethyl ketone) | ° | 104 | 107 | 108 | 108 | 103 | 106 | 106 | |
| Compressive strength (when density of molded product is 30 g/L) | MPa | 0.278 | 0.264 | 0.244 | 0.245 | 0.277 | 0.265 | 0.244 | |

Comparative Examples 1 to 7

[Preparation of Polypropylene Resin Particles]

The same operations as described in Examples were performed, except that the amounts of the polypropylene resin and additives were those shown in Table 2. In this way, polypropylene resin particles were obtained.

[Preparation of First-Step Expanded Particles]

The same operations as described in Examples were performed, except that the adding amounts of carbon dioxide, foaming temperature, and foaming pressure were changed as shown in Table 2. In this way, expanded polypropylene resin particles (first-step expanded particles) were obtained.

The obtained first-step expanded particles were measured for entire melting heat quantity, high temperature-side melting heat quantity, low temperature-side melting heat quantity, high-temperature heat quantity ratio, expansion ratio, bulk density, and cell diameter. The results are shown in Table 2.

[Preparation of Second-Step Expanded Particles]

Second-step expanded particles were prepared only in Comparative Example 7. The obtained first-step expanded particles were dried at 80° C. for 6 hours, and thereafter the particles were impregnated with pressurized air in a pressure-resistant container so that the internal pressure was 0.28 MPa (absolute pressure), and thereafter were brought into contact with steam at 0.08 MPa (gage pressure), such that the particles were subjected to the second-step expansion. The obtained second-step expanded particles were measured for entire melting heat quantity, high temperature-side melting heat quantity, low temperature-side melting heat quantity, high-temperature heat quantity ratio, expansion ratio, bulk density, and cell diameter. The results are shown in Table 2.

[Preparation of in-Mold Expanded Molded Product]

The same operations as described in Examples were performed, except that the first-step expanded particles or the second-step expanded particles were poured into a pressure-resistant container and the internal pressure of the expanded particles was changed as shown in Table 2. In this way, a polypropylene resin in-mold expanded molded product was obtained. The obtained molded product was evaluated for moldability and measured for density, frictional sound, frictional sound pressure, contact angle, and 50%-strained compressive strength. The results are shown in Table 2.

Comparative Example 8

[Preparation of Polypropylene Resin Particles]

100 parts by weight of a polypropylene resin (a), 0.03 parts by weight of talc as an expansion nucleating agent, and 10 parts by weight of polysiloxane masterbatch were mixed with the use of a blender. The mixture obtained was melted and kneaded at a resin temperature of 220° C. and extruded in a strand shape with the use of a twin-screw extruder (manufactured by O. N. Machinery Co., Ltd., TEK45). The strand thus extruded was water-cooled in a water tank having a length of 2 m, and was then cut. This resulted in polypropylene resin particles (1.2 mg per particle).

[Production of First-Step Expanded Particles]

100 parts by weight of the polypropylene resin particles obtained, 300 parts by weight of water, 1.5 parts by weight of powdered basic tribasic calcium phosphate as a dispersing agent, 0.05 parts by weight of n-paraffin sodium sulfonate, and an amount shown in Table 2 of isobutane as a foaming agent were placed in a 10 L-pressure-resistant container. While the resultant mixture was stirred, the temperature of the mixture was raised to a foaming temperature shown in a corresponding part in Table 2 and the mixture was retained for 10 min. Then, isobutane was additionally injected into the pressure-resistant container so that a foaming pressure was adjusted to a value shown in a corresponding part in Table 2. Then, the foaming pressure was retained for 30 min. Then, a valve at a lower part of the pressure-resistant container was opened while nitrogen was injected into the pressure-resistant container such that the temperature and pressure in the pressure-resistant container were retained. An aqueous dispersion medium was released from the valve into air under atmospheric pressure through an orifice plate having an opening diameter of 4.0 mm, so that expanded polypropylene resin particles (first-step expanded particles) were obtained. The obtained first-step expanded particles were measured for entire melting heat quantity, high temperature-side melting heat quantity, low temperature-side melting heat quantity, high-temperature heat quantity ratio, expansion ratio, bulk density, and cell diameter. The results are shown in Table 2.

[Preparation of in-Mold Expanded Molded Product]

The same operations as in Examples were performed to achieve in-mold foaming molding. The obtained molded product was evaluated for moldability and measured for density, frictional sound, frictional sound pressure, contact angle, and 50%-strained compressive strength. The results are shown in Table 2.

TABLE 2

| | | | | Comparative Examples | | | | | | | |
|---|---|---|---|---|---|---|---|---|---|---|---|
| | | | | 1 | 2 | 3 | 4 | 5 | 6 | 7[X.1] | 8 |
| Polypropylene resin particles | Resin (a) | Polypropylene | parts by weight | 100 | 100 | 100 | 100 | 100 | 100 | 100 | 100 |
| | Product (b) | Sample A | parts by weight | 0 | 0 | 0 | 0 | 0 | 0 | 0 | 0 |

TABLE 2-continued

|  |  |  |  | Comparative Examples | | | | | | | |
|---|---|---|---|---|---|---|---|---|---|---|---|
|  |  |  |  | 1 | 2 | 3 | 4 | 5 | 6 | 7[X.1] | 8 |
|  |  | Product (b) + Component (d) | Commercially-available Sample B (Rikeeido SG-100P) | parts by weight | 0 | 5 | 0 | 0 | 0 | 0 | 0 | 0 |
|  |  |  | Commercially-available Sample B (Rikeeido SG-170P) | parts by weight | 0 | 0 | 5 | 0 | 0 | 0 | 0 | 0 |
|  |  |  | Sample B | parts by weight | 0 | 0 | 0 | 0 | 0 | 0 | 0 | 0 |
|  |  | Water absorbing substance (c) | Polyethylene glycol | parts by weight | 0.5 | 0 | 0 | 0.5 | 3 | 0.5 | 0.5 | 0 |
|  |  | Expansion nucleating agent | Talc | parts by weight | 0.1 | 0.1 | 0.1 | 0.1 | 0.1 | 0.1 | 0.1 | 0.03 |
|  |  | Polysiloxane | BY27-001S | parts by weight | 0 | 0 | 0 | 3 | 3 | 10 | 10 | 10 |
| Expanded polypropylene particles | Foaming conditions | Initial amount of carbon dioxide | parts by weight | 5.83 | 5.83 | 5.83 | 5.83 | 5.83 | 5.83 | — | — |
|  |  | Initial amount of isobutane | parts by weight | — | — | — | — | — | — | — | 14.0 |
|  |  | Foaming temperature | °C. | 148.9 | 148.9 | 148.9 | 148.9 | 149.1 | 148.9 | — | 143.5 |
|  |  | Foaming pressure (gage pressure) | MPa | 2.80 | 2.80 | 2.80 | 2.80 | 2.40 | 2.80 | — | 1.80 |
|  | Quality | Entire melting heat quantity | J/g | 92.0 | 88.5 | 88.0 | 90.0 | 89.0 | 88.0 | 87.4 | 85.0 |
|  |  | High temperature-side melting heat quantity | J/g | 18.0 | 17.0 | 16.0 | 17.0 | 16.5 | 16.0 | 15.0 | 16.0 |
|  |  | Low temperature-side melting heat quantity | J/g | 73.0 | 72.0 | 71.0 | 72.0 | 72.0 | 71.5 | 71.0 | 71.0 |
|  |  | High-temperature heat quantity ratio | % | 19.6 | 19.2 | 18.2 | 18.9 | 18.5 | 18.2 | 17.2 | 18.8 |
|  |  | Expansion ratio | times | 19.1 | 9.0 | 11.0 | 15.0 | 18.0 | 10.2 | 20.0 | 19.5 |
|  |  | Bulk density | g/L | 26.7 | 57.0 | 45.0 | 34.0 | 30.0 | 51.0 | 27.0 | 27.5 |
|  |  | Cell diameter | μm | 105 | 130 | 125 | 120 | 165 | 110 | 138 | 220 |
| Polypropylene in-mold expanded molded product | Conditions for in-mold foaming molding | Internal pressure of expanded particles (absolute pressure) | MPa | 0.21 | 0.20 | 0.20 | 0.20 | 0.21 | 0.20 | 0.20 | 0.20 |
|  | Evaluations of physical properties | Minimum heating steam pressure for molding (gage pressure) | MPa | 0.28 | 0.28 | 0.28 | 0.30 | 0.30 | 0.34 | 0.32 | 0.34 |
|  |  | Fusibility of molded product | — | E | E | E | G | G | F | F | F |
|  |  | Surface appearance of molded product | — | E | E | E | G | G | G | G | G |
|  |  | Density of molded product | g/L | 31.0 | 69.0 | 67.0 | 39.5 | 35.0 | 55.0 | 32.0 | 32.0 |
|  |  | Frictional sound evaluation-1 | — | P | E | E | E | E | E | E | E |
|  |  | Frictional sound evaluation-2 (after cleaning with methyl ethyl ketone) | — | P | E | E | P | P | P | P | P |
|  |  | Frictional sound pressure | dB | 40 | 21 | 20 | 25 | 25 | 23 | 23 | 23 |
|  |  | Contact angle-1 | ° | 96 | 101 | 108 | 106 | 106 | 107 | 107 | 107 |
|  |  | Contact angle-2 (after cleaning with methyl ethyl ketone) | ° | 96 | 101 | 108 | 97 | 97 | 98 | 98 | 98 |
|  |  | Compressive strength (when density of molded product is 30 g/L) | MPa | 0.288 | 0.265 | 0.275 | 0.260 | 0.240 | 0.250 | 0.240 | 0.230 |

[X.1] Second-step expanded particles were prepared in Comparative Exam30 g/L)ple 7.

One or more embodiments of the present invention are suitable for use in applications of car interior materials, returnable containers for electric or electronic components, and the like. Furthermore, a molded product prepared from expanded polyolefin resin particles of one or more embodiments of the present invention is also highly water repellent and thus one or more embodiments of the present invention are also suitable for use in applications of returnable containers which are to be cleated and reused (e.g., returnable containers for food) and the like.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

What is claimed is:

1. An expanded polyolefin resin particle, obtained by expanding a polyolefin resin particle using water and/or an inorganic gas as a foaming agent, wherein the polyolefin resin particle comprises:
   a polyolefin resin;
   a product obtained by heating and kneading a mixture; and
   a water absorbing substance, wherein the mixture comprises a first polypropylene resin, a polypropylene wax, a polyorganosiloxane comprising at least one silicon-atom-bound radical polymerizable functional group per molecule, and an organic peroxide.

2. The expanded polyolefin resin particle according to claim 1, wherein the polyolefin resin particle further comprises a non-radical polymerizable polyorganosiloxane.

3. The expanded polyolefin resin particle according to claim 1, wherein the polyolefin resin is a second polypropylene resin.

4. The expanded polyolefin resin particle according to claim 1, wherein the water absorbing substance is at least one selected from the group consisting of melamine, glycerin, diglycerin, polyethylene glycol, and zinc borate.

5. The expanded polyolefin resin particle according to claim 1, wherein an amount of the product is 0.5 to 15 parts by weight with respect to 100 parts by weight of the polyolefin resin, and wherein the polyorganosiloxane is grafted on the first polypropylene resin and the polypropylene wax.

6. The expanded polyolefin resin particle according to claim 1, wherein an amount of the water absorbing substance is 0.01 to 1 part by weight with respect to 100 parts by weight of the polyolefin resin.

7. The expanded polyolefin resin particle according to claim 2, wherein an amount of the non-radical polymerizable polyorganosiloxane is 10 to 60 parts by weight with respect to 100 parts by weight of the product, and wherein the polyorganosiloxane is grafted on the first polypropylene resin and the polypropylene wax.

8. A method for producing expanded polyolefin resin particles, the method comprising:
dispersing polyolefin resin particles and a foaming agent into an aqueous dispersion medium in a closed vessel;
heating inside of the closed vessel to a temperature equal to or higher than a softening temperature of the polyolefin resin particles while applying an internal pressure to the closed vessel; and
releasing the aqueous dispersion medium to a region having a pressure lower than the internal pressure of the closed vessel to obtain the expanded polyolefin resin particles,
wherein the polyolefin resin particles comprise:
a polyolefin resin;
a product obtained by heating and kneading a mixture; and
a water absorbing substance,
wherein the mixture comprises a polypropylene resin, a polypropylene wax, a polyorganosiloxane comprising at least one silicon-atom-bound radical polymerizable functional group per molecule, and an organic peroxide, and
wherein the foaming agent is water and/or an inorganic gas.

9. The method according to claim 8, wherein the polyolefin resin particles comprise:
100 parts by weight of the polyolefin resin;
0.5 to 15 parts by weight of the product obtained by heating and kneading the mixture; and
0.01 to 1 part by weight of the water absorbing substance.

* * * * *